US005490252A

United States Patent [19]
Macera et al.

[11] Patent Number: 5,490,252
[45] Date of Patent: Feb. 6, 1996

[54] SYSTEM HAVING CENTRAL PROCESSOR FOR TRANSMITTING GENERIC PACKETS TO ANOTHER PROCESSOR TO BE ALTERED AND TRANSMITTING ALTERED PACKETS BACK TO CENTRAL PROCESSOR FOR ROUTING

[75] Inventors: Mario Macera, Newton; William E. Jennings, Hopkinton; Dennis Josifovich, Northborough; George W. Kajos, Auburn; John A. Mastroianni, Hopkinton; Francis E. Neil, Chelmsford; Victor Bennett, Ipswich; Frank J. Bruns, Medfield; Gururaj Deshpande, Andover; Jeremy Greene, Stow, all of Mass.

[73] Assignee: Bay Networks Group, Inc., Santa Clara, Calif.

[21] Appl. No.: 954,617

[22] Filed: Sep. 30, 1992

[51] Int. Cl.$^6$ .................................................. G06F 13/00
[52] U.S. Cl. .................... 395/200.01; 370/60; 370/94.1; 370/85.13; 364/222.2; 364/242.94; 364/284.4; 364/DIG. 1
[58] Field of Search .......................... 395/200; 370/94.1, 370/85.13, 85.15, 95.1, 60, 85.14, 60, 13, 85.5

[56] References Cited

U.S. PATENT DOCUMENTS

| | | | |
|---|---|---|---|
| 4,058,672 | 11/1977 | Crager et al. | 370/60 |
| 4,445,116 | 4/1984 | Grow | 370/118 |
| 4,706,081 | 11/1987 | Hart et al. | 370/61 |
| 4,707,827 | 11/1987 | Bione et al. | 370/85 |
| 4,870,641 | 9/1989 | Puttavina | 370/60 |
| 4,897,841 | 1/1990 | Gang, Jr. | 370/85.13 |

(List continued on next page.)

FOREIGN PATENT DOCUMENTS

| | | |
|---|---|---|
| 0456249A3 | 11/1991 | European Pat. Off. . |
| WO91/16679 | 10/1991 | WIPO . |

OTHER PUBLICATIONS

"Local Networks", by William Stallings, 1990, pp. 32–33 and 410–416.
Press release entitled "Coral Network Announces Broadband Enterprise Switch; Product Enables Companies to Build High–Performance Enterprise–Wide Networks", Jan. 21, 199 by Coral Network Corporation.
Lippis, Nick, Titled "The Internet Work Decade, At interop . . . and Beyond", *Data Communications International*, Oct. 1991, No. 14, New York, US, pp. 82–110.
Salamone, Salvatore, Titled "This Engine's Built for Routing", *Data Communications International*, Feb. 1993, No. 3, New York, US, pp. 109–110.
"Sophisticated New LAN Interconnection Device—The TransPATH Router–Bridge", Vitalink Communications Corporation, Jul. 24, 1989.

*Primary Examiner*—Thomas C. Lee
*Assistant Examiner*—Moustafa M. Meky

[57] ABSTRACT

An internetworking system for exchanging packets of information between networks, the system comprising a network interface module for connecting a network to the system, receiving packets from the network in a native packet format used by the network and converting each received native packet to a packet having a generic format common to all networks connected to the system, and converting each of the generic packets to the native packet format for transmission to the network; a communication channel for carrying the generic packets to and from the network interface module, the channel having bandwidth; a first processing module for controlling dynamic allocation and deallocation of the channel bandwidth to the network connected to the system via the network interface module; and a second processing module for receiving all of the generic packets put on the channel by the network interface module, determining a destination network interface module for each of the generic packets on the channel, determining whether each of the generic packet needs to be bridged to the destination network interface module, and transmitting each of the generic packets determined to need bridging to the destination network interface module via the channel.

11 Claims, 10 Drawing Sheets

U.S. PATENT DOCUMENTS

| | | | |
|---|---|---|---|
| 4,905,231 | 2/1990 | Leung et al. | 370/94.1 |
| 5,018,137 | 5/1991 | Backs et al. | 370/85.13 |
| 5,060,228 | 10/1991 | Tsutsui et al. | 370/85.13 |
| 5,088,032 | 2/1992 | Bosack | 395/200 |
| 5,088,090 | 2/1992 | Yucoby | 370/85.13 |
| 5,133,053 | 7/1992 | Johnson et al. | 395/200 |
| 5,142,622 | 8/1992 | Owens | 395/200 |
| 5,229,994 | 7/1993 | Bulzano et al. | 370/85.13 |
| 5,235,592 | 8/1993 | Cheng et al. | 370/85.4 |
| 5,235,595 | 8/1993 | O'Dowd | 370/94.1 |
| 5,241,682 | 8/1993 | Bryant et al. | 395/200 |
| 5,251,205 | 10/1993 | Callon et al. | 370/60 |
| 5,274,631 | 12/1993 | Bhardwaj | 370/60 |
| 5,287,103 | 2/1994 | Kasprzyk et al. | 370/94.1 |
| 5,293,488 | 3/1994 | Riley et al. | 395/200 |
| 5,309,437 | 5/1994 | Perlman et al. | 370/85.13 |
| 5,331,636 | 7/1994 | Yang et al. | 370/85.5 |

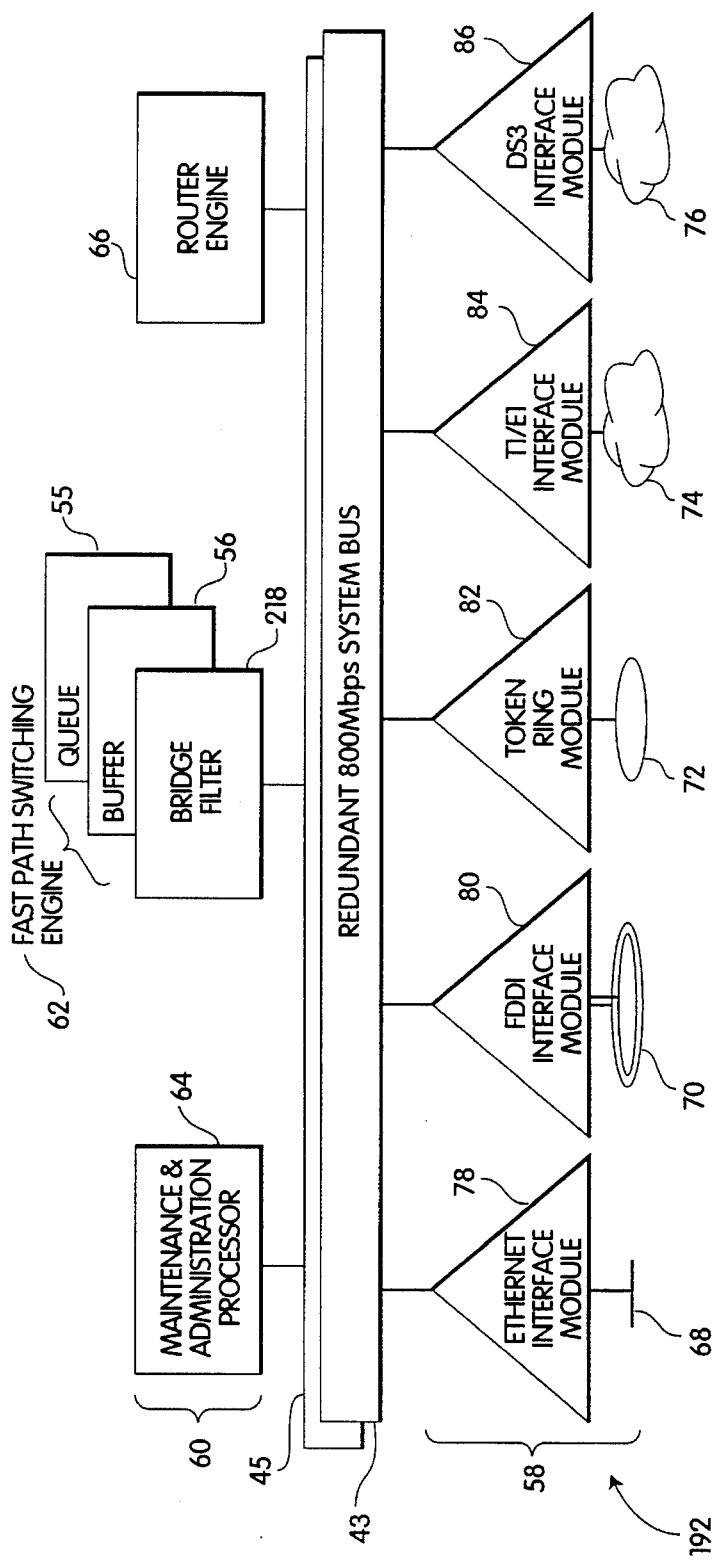
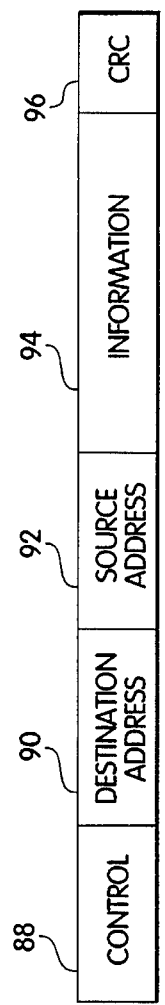
Fig. 3
Fig. 4

| INTERFACE TYPE | INTERFACES PER MODULE | INTERFACS PER SYSTEM |
|---|---|---|
| ETHERNET AUI | 2 | 20 |
| ETHERNET BNC | 2 | 20 |
| TOKEN RING (4Mbps) | 2 | 20 |
| TOKEN RING (16Mbps) | 2 | 14 |
| FDDI | 1 | 3 |
| T1 | 4 | 28 |
| E1 | 4 | 28 |

Fig. 17

| NAME | LENGTH (BYTES) | PURPOSE |
|---|---|---|
| FRAME RELAY | 2 | TRANSIT DLCI AND INTERNALLY DEFINED |
| ACCESS CONTROL | 1 | (802.5) - TOKEN RESERVATION, PRIORITY |
| FRAME CONTROL | 1 | (802.5, FDDI) - FRAME TYPE INFO |
| DESTINATION ADDRESS | 6 | IEEE 48 BIT ADDRESS |
| SOURCE ADDRESS | 6 | IEEE 48 BIT ADDRESS |
| INFORMATION | 32K - | SIZE OF (HEADER AND TRAILER FIELDS) |
| PAD (OPTIONAL) | 0 - 3 | ALIGN TO 32 BIT BOUNDARIES |
| LENGTH | 2 | NUMBER OF NETWORK PDU BYTES |
| INCOMING PORT | 1 | EXTERNAL INPUT INTERFACE LOGICAL NUMBER |
| PREROUTE | 1 | INTERNAL DLP ESCAPE MECHANISIM |
| PLSAP | 1 | PROTOCOL TYPE OR LSAP |
| CRC | 2 | INTERNAL DPIC-GENERATED CRC |

Fig. 18

SYSTEM HAVING CENTRAL PROCESSOR FOR TRANSMITTING GENERIC PACKETS TO ANOTHER PROCESSOR TO BE ALTERED AND TRANSMITTING ALTERED PACKETS BACK TO CENTRAL PROCESSOR FOR ROUTING

FIELD OF THE INVENTION

This invention relates to internetworking devices and methods, and more particularly, to a broadband enterprise switch capable of interconnecting a variety of networks.

BACKGROUND OF THE INVENTION

Known compute-intensive network applications demand increased bandwidth. With the deployment of multi-media workstations, the use of image processing in the healthcare and banking industries, electronic publishing, and CAD/CAE applications in the engineering environment, an internetworking product which can support performance requirements across practically any geographic distance is required.

In general, a network includes a collection of autonomous machines which are interconnected (e.g., via wires, optical fibers, satellites, etc.) in order to run user (i.e., application) programs. A computer network is a network which typically includes at least one autonomous computer. The term network as used herein generally should be taken to mean computer network. Internetworking generally means the connection of two or more computer networks to allow an exchange of information between the networks. The information exchanged between ("inter") the various networks and among ("intra") the individual networks typically is contained in discrete packets which can be arranged in a variety of formats.

Bridges and routers generally are internetworking devices which can be used to interconnect or extend packet-based local area networks (LANs) or subnetworks. Both bridges and routers can make forwarding or routing decisions based on information in the LAN packet headers. A bridge differs fundamentally from a router. A bridge typically relays Media Access Control (MAC) layer (or data link layer which is layer two in the OSI model) frames and decisions are made based on information in the frame header. A router relays network layer (layer three in the OSI model) datagrams an decisions are based on information in the network layer header. This fundamental difference affects the way each type of device operates, and consequently, the applications to which it is best suited.

Bridges and routers currently employed for internetworking typically use shared-bus architectures in which bandwidth is shared between networks on a statistical first come, first served basis.

Because network downtime usually equates to lost productivity, lost business, and user dissatisfaction, many companies desire a reliable, robust internetworking device that provides high system and network availability as well as the security of non-stop networking for many, if not all, network applications.

To be most useful, an internetworking device should maximize reliability, availability, and serviceability. Also, the device should provide organizations with the flexibility and the performance capability required to accommodate organizational growth and technological evolution.

SUMMARY OF THE INVENTION

In general, in one aspect, the invention features an internetworking system for exchanging packets of information between networks, the system comprising a network interface module for connecting a network to the system, receiving packets from the network in a native packet format used by the network and converting each received native packet to a packet having a generic format common to all networks connected to the system, and converting each of the generic packets to the native packet format for transmission to the network; a communication channel having bandwidth and for carrying the generic packets to and from the network interface module; a first processing module for controlling dynamic allocation and deallocation of the channel bandwidth to the network connected to the system via the network interface module; and a second processing module for receiving all of the generic packets put on the channel by the network interface module, determining a destination network interface module for each of the generic packets on the channel, determining whether each of the generic packets needs to be bridged to the destination network interface module, and transmitting each of the generic packets determined to need bridging to the destination network interface module via the channel.

Embodiments of this aspect of the invention include the following features. Time division multiplexing may be utilized in the dynamic allocation and deallocation of the communication channel bandwidth performed by the first processing module. The second processing module may comprise dedicated electronic components for performing all functions required of the second processing module including receiving all of the generic packets put on the channel by the network interface module and determining a destination network interface module for each of the generic packets on the channel and whether each of the generic packets needs to be bridged to the destination network interface module. The network interface module and any of the processing modules may be inserted or removed from the system while the system is operational substantially without disruption to the operation of the system in which case the first processing module dynamically allocates or deallocates the communication channel bandwidth to the network interface module and any of the processing modules which are so inserted or removed. This feature is referred to as "hot swapping." The system further may comprise at least one redundant network interface module which is a duplicate of the network interface module to provide fault tolerance. A logical network can be formed which includes one or more users from a plurality of physical networks connected to the system.

In other embodiments of this aspect of the invention, the second processing module also may determine whether each of the generic packets needs to be routed to the destination network interface module, and the system may further comprise a third processing module for receiving each of the generic packets determined to need routing from the second processing module via the channel and transmitting those generic packets back to the second processing module via the channel and the second processing module transmitting those generic packets to the destination network interface module via the channel. Time division multiplexing may be utilized in the dynamic allocation and deallocation of the communication channel bandwidth performed by the first processing module. The second processing module can comprise dedicated electronic components. The network interface module and any of said processing modules may be "hot swapped." The system further may comprise at least one redundant network interface module for fault tolerance. A logical network can be formed which includes one or more users from a plurality of networks connected to the system.

An internetworking system according to the invention can integrate both bridging and routing functions. Alternatively, the system can operate as a pure bridging device or as a multiprotocol router. The system can support performance requirements across practically any geographic distance and does not use a contention bus which typically causes bottlenecks.

The system can provide high availability and the security of essentially non-stop operation. The system maximizes reliability, availability, and serviceability. Also, the system can provide organizations with the flexibility and the performance capability required to accommodate organizational growth and technological evolution.

Other aspects, features, objects, and advantages of the invention will become apparent from the following description and from the claims.

BRIEF DESCRIPTION OF THE DRAWINGS

FIG. 3 is a diagram of various networks connected to various electronic processor modules via a broadband enterprise switch bus;

FIG. 4 is a diagram of a format of an internal packet which may be used by a broadband enterprise switch;

FIG. 17 is a table summarizing features of some network interface modules according to the invention; and FIG. 18 is a table identifying fields of an internal packet format which may be used by a broadband enterprise switch according to the invention.

DETAILED DESCRIPTION

Overview

In one embodiment, the invention includes a Broadband Enterprise Switch (BES) which is a high performance, high availability internetworking nodal processor combining, for example, native-speed local area network (LAN) interconnection, high-bandwidth wide area network (WAN) access, and non-stop networking for mission critical applications. The BES can be used to interconnect a plurality of individual networks such as many or all of the networks operated by a large corporation whose operations could be located in different geographic areas.

The BES can utilize an integrated internetworking architecture to combine the benefits of multiprotocol routing and high performance bridging, and may be capable of supporting applications that span multiple networks. The BES can include, for example, standard interfaces for FDDI, Ethernet, and Token Ring LANs as well as T1, E1, and DS3 interfaces for linking remote and/or local LANs (an example of a local LAN might be a campus network) together across a public or private WAN.

The BES can provide high performance LAN internetworking via a central switch design that moves traffic between networks at full native network speeds, thereby effectively removing the bottlenecks that occur with known network interconnection devices. The throughput of the BES can allow full utilization of the available bandwidth of networks interconnected by the BES and allow users to take full advantage of the increased capacity available from, for example, known fiber optic technology such as FDDI and DS3, as well as future services such as SONET.

The BES also can include a redundant architecture to achieve high reliability, as well as intelligent self-diagnosing and self-healing operations.

Figure 1:
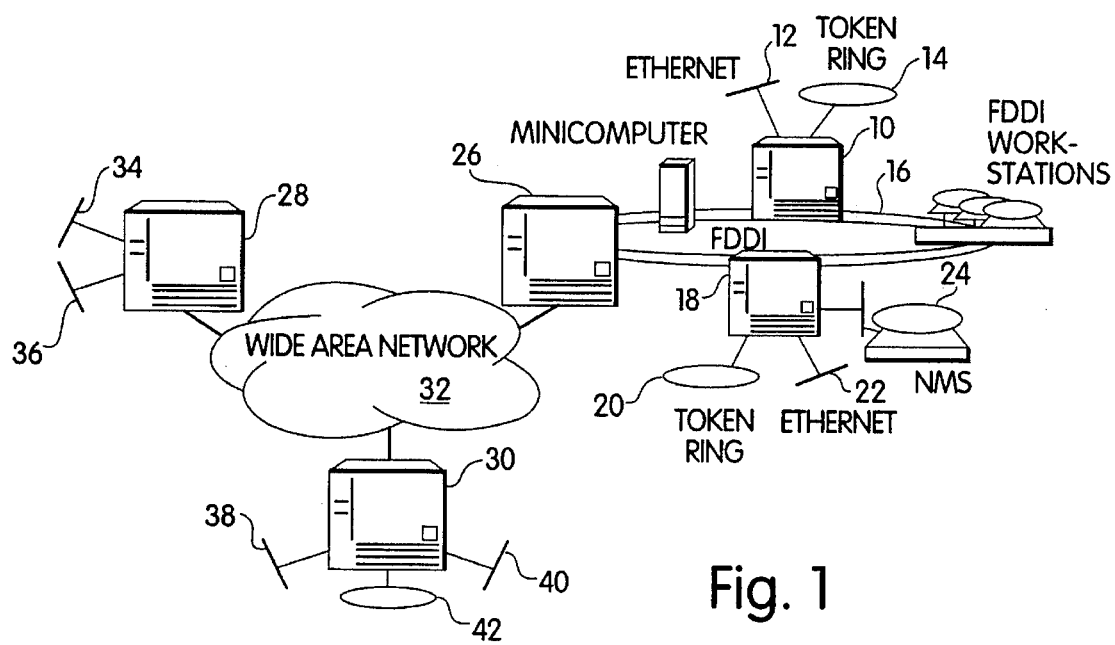
FIG. 1 is a diagram of a variety of networks interconnected using several broadband enterprise switches according to the invention.

One example of the use of the BES to interconnect various networks is shown in FIG. 1. Referring to FIG. 1, a first BES 10 may interconnect an Ethernet LAN 12 and a Token Ring LAN 14 to an FDDI "backbone" 16. Another BES 18 can interconnect a Token Ring LAN 20, an Ethernet LAN 22, and a Network Management System (NMS) 24 to the FDDI 16. A third BES 26 might be used to interconnect the FDDI 16 to a fourth BES 28 and/or a fifth BES 30 via a WAN 32. The fourth and fifth BESs 28, 30 can themselves have one or more LANs (or WANs) connected. In the example of FIG. 1, the fourth BES 28 interconnects two Ethernet LANs 34, 36 to the rest of the system, and the fifth BES 30 interconnects two Ethernet LANs 38, 40 and a Token Ring LAN 42. Note that FIG. 1 is only an example; a variety of other networks, whether LANs, WANs, or metropolitan area networks (MANs), also may be interconnected via one or more BESs.

Some benefits of the BES are high performance transparent internetworking, a resilient architecture which provides non-stop internetworking, an extendable standards-based platform, and a comprehensive manageability capability.

Depending on a particular embodiment, the BES can support high performance LAN internetworking and high speed WAN interconnection with an aggregate system throughput of approximately 400,000 packets per second (pps). With the ability to interconnect networks at their full native bandwidth, the BES can facilitate the networking of high-speed applications that span local, metropolitan, and wide areas. The BES may extend performance across geographic boundaries and remove the typical interconnect bottlenecks that decrease performance and service satisfaction to the end users of known systems.

In a corporate campus or metropolitan-area application, the BES can maximize the utility of a backbone interconnect medium such as 100 megabits per second (Mbps) FDDI. A campus network can be created that, for example, transparently interconnects lower speed departmental Ethernet and Token Ring LANs via an FDDI building backbone, and internetworks multiple FDDI building backbones. High speed WAN access may also be supported for extending local performance to remote offices. Such an enterprise internetworking architecture may fit the performance requirements of corporations in a wide variety of applications including engineering, manufacturing, finance, retail, and service.

The BES may utilize an 800 Mbps non-blocking system bus. Preferably, a redundant system bus also is included (i.e., the BES uses a dual data bus). With this bus architecture, the BES can dynamically allocate a fixed amount of bandwidth through the system to each attached network, the dynamically allocated bandwidth preferably being equal to the native network speed. The attached network may be, for example, a 10 Mbps Ethernet network, a 100 Mbps FDDI network, or a 45 Mbps DS3 connection to a WAN. With 800 Mbps of available bus bandwidth, the BES can support multiple high speed connections and guarantee that the full network bandwidth is available to each connected network. As a result, the BES may move data packet traffic transparently between LANs, MANs, and WANs at the full capacity of the LANs, MANs, and WANs that are interconnected by the BES, as long as the load on the bus does not exceed the throughput capacity (e.g., 800 Mbps) of the bus. Note that known bridges and routers typically use shared-bus architectures in which bandwidth is shared between networks on a statistical first come, first served basis.

Figure 2:
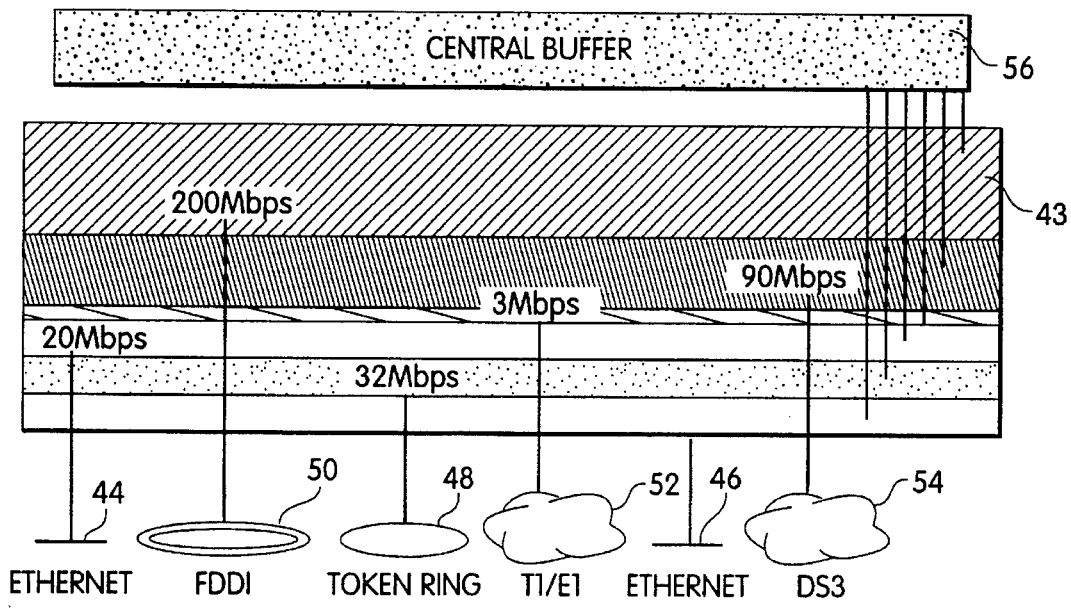
FIG. 2 is a diagram of a variety of networks connected to a bus of a broadband enterprise switch.

Referring to FIG. 2, a bus 43 (preferably two duplicate busses are included for redundancy) in a BES can be used to interconnect, for example, two Ethernet LANs 44 and 46, a Token Ring LAN 48, an FDDI 50, a T1/E1 WAN 52, and a DS3 54. In this example, because the total (additive) capacity required by all connected networks (i.e., 365 Mbps) is less than the capacity of the system bus (e.g., 800 Mbps), each of these connected networks is capable of communicating with the bus of the BES at their normal, native (i.e., full) rate. For example, the Ethernet LAN 44 can transmit data to and receive data from the BES at 20 Mbps. The information on the bus 43 is transferred to a central buffer 56 which preferably operates at the same speed as the bus (e.g., 800 Mbps).

The central buffer 56 can store all data packets from the time they enter the system until they are switched to an output port. Each data packet residing in the central buffer preferably is referenced by pointers. This relieves the system of unnecessary packet movement between input buffers, switching processors, and output queues; a process which wastes valuable bus bandwidth and processing cycles and which generally degrades overall system performance.

In the disclosed embodiment, a central switch controls the central buffer. The central switch is also referred to as a Fast Path Switching Engine (FPSE) and/or a Data Link Processor (DLP). The FPSE may perform high speed filtering and forwarding of data packets. The FPSE can process data packets of varying lengths, arriving at varying rates, with minimal delay. The critical data paths of the FPSE preferably include only discrete components and use no microprocessor technology. Consequently, the buffering, queuing, filtering, and forwarding functions can be accomplished without the time-consuming buffering and interrupt procedures typically associated with known general-purpose microprocessor-based switches. As a result, the FPSE can switch packets at native network speeds, essentially independent of the packet size and/or the packet arrival rate.

The FPSE can be complemented by multiple, dedicated, high speed RISC processors for managing packet movement in and out of the FPSE, forwarding routed packets, and monitoring and controlling the overall system operation. Referring to FIG. 3, the system bus 43 (and its redundant duplicate 45, which preferably is provided) can connect various networks 58 to various electronic processing modules 60. The electronic processing modules 60 might include the FPSE 62, a Maintenance & Administration Processor (MAP) 64 which can include one or more of the RISC processors, and a Router Engine 66 which also can include one or more RISC processors. The MAP 64 and the Router Engine 66 are described later, but briefly, in the disclosed embodiment, the MAP 64, the Router Engine 66, and the FPSE 62 are contained on one or more "cards" or modules which are insertable/removable from a backplane of the BES. The networks 58 might include an Ethernet LAN 68, an FDDI 70, a Token Ring LAN 72, a T1/E1 WAN 74, and a DS3 WAN 76. As shown in FIG. 3, the networks are connected to the bus 43 of the BES via network interface modules 78, 80, 82, 84, and 86. Each network interface module can be a "card" or module which is insertable/removable from a backplane of the BES.

The RISC processors typically operate in parallel with the FPSE 62 to assure that multiple activities occur simultaneously thereby maximizing performance of the BES. In the disclosed embodiment, the BES can support a filtering and forwarding rate of about 400,000 pps for bridging applications, and a rate of at least 25,000 pps for routing applications.

The BES may convert all LAN data packets into a consistent "internal packet format" (also referred to as "canonical packet format") at each of the network interface modules. In the disclosed embodiment, the internal packet format is a superset of the standard packet types of known packet formats. The use of the internal packet format simplifies the switch processing task. Future network interfaces whose packet type is a subset of the internal packet format can be accommodated. After the packet is processed by the central switch, it typically is converted to an appropriate output packet format by an output network interface module and transmitted to the output network in a format acceptable to the output network. This technique effectively normalizes the way different packets types and sizes are handled by the BES thereby allowing the highest performance throughput possible for all BES traffic. As a result, the BES may support transparent translation between Ethernet, Token Ring, and FDDI networks at their full native speed for both bridged and routed applications.

Referring to FIG. 4, the internal packet utilized in the disclosed embodiment may include a control field 88, a destination address field 90, a source address field 92, and information field 94, and a cyclic redundancy code (CRC) field 96. Other fields preferably are included and are described in more detail below.

The BES preferably is designed to maximize reliability, availability, and serviceability. Reliability may be provided with 100% equipment redundancy for all of the system components. Availability is maximized with an automatic switchover operation and "hot swap" capability. With a comprehensive set of alarms and self-diagnosing operation, the BES can support serviceability by non-technical staff. These features allow corporations to place their applications on the BES without the costly threat of downtime and the resulting loss of access to essential resources.

The BES architecture can support redundancy for all system components. In the disclosed embodiment, a fully redundant 800 Mbps system bus is provided as part of the standard system configuration. One-to-one redundancy can be supported for the power supply modules, the processing modules, and all of the LAN network interface modules (e.g., Ethernet, FDDI and Token Ring). Two-to-one redundancy can be supported for the WAN network interface modules (e.g., T1, E1, and DS3). Redundant power supplies support load sharing in normal operation.

Figure 5:
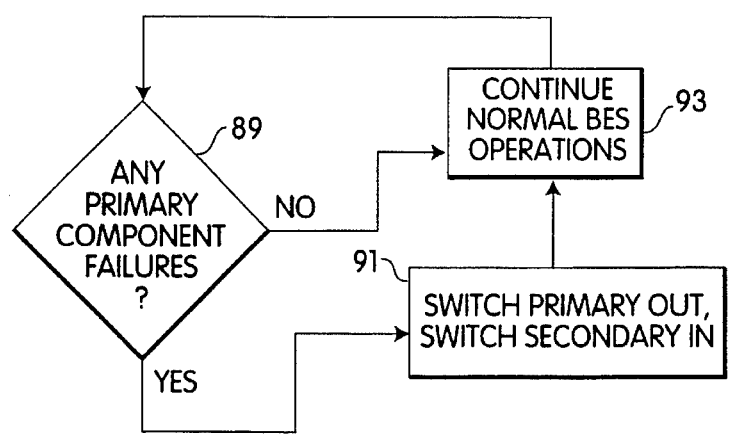
FIG. 5 is a flowchart diagram of a reconfiguration feature which may be used by a broadband enterprise switch.

The BES may be self-diagnosing and self-healing. The BES may support both active and passive monitoring of each hardware component in the system such that a failed component, such as a network interface module, can be automatically taken down and the redundant component (if configured) switched into service in a matter of seconds. When performed, this automatic system reconfiguration feature generally is not noticed by a network user. This switchover operation typically occurs with minimal disruption to the network's availability and performance, thereby allowing nonstop network operation to be realized. Referring to FIG. 5, with such redundancy, the BES can monitor all "primary" (i.e., active or on-line) components (e.g., modules or cards), step 89, and make an associated "secondary" (i.e., standby or backup) component active, step 91, when/if the primary fails. The BES can then continue normal operations, step 93, utilizing the secondary in place of the primary.

Figure 6:
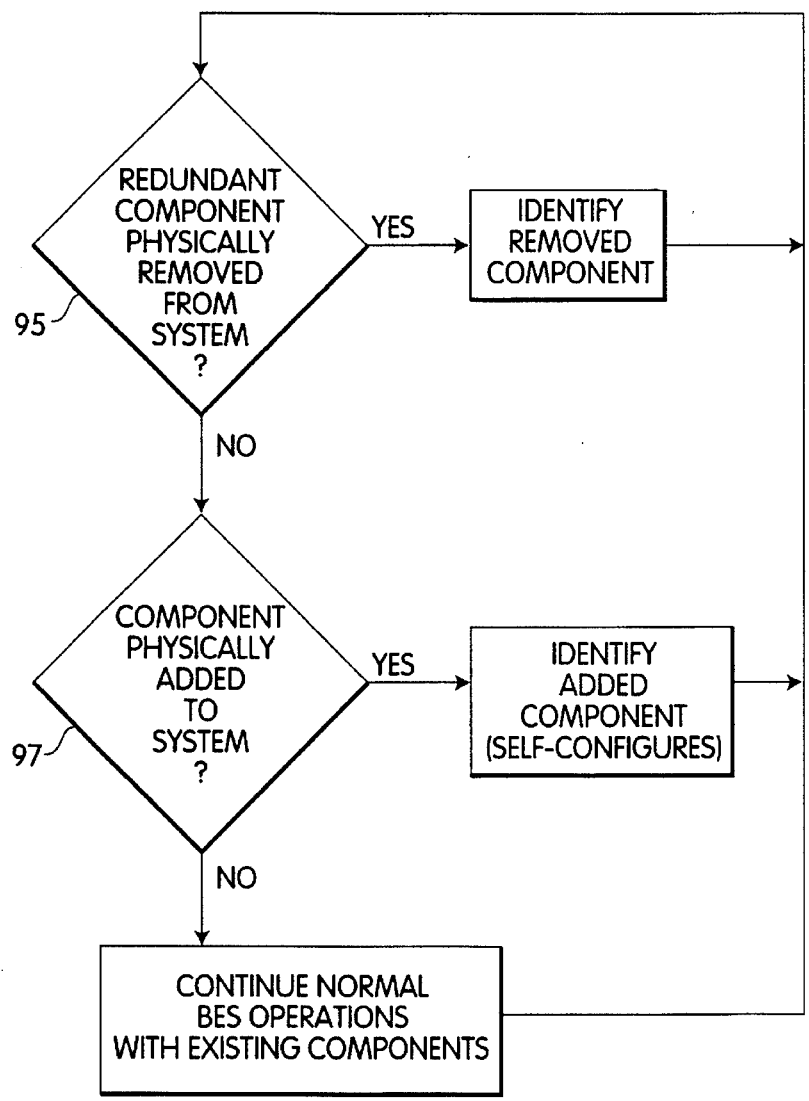
FIG. 6 is a flowchart diagram of a "hot swap" feature which may be used by a broadband enterprise switch.

High BES system availability may be realized because of the following features of a BES according to the invention. All modules of the BES may be accessed from the front of the system and typically support "hot" insertion and removal (i.e., "hot swap"). Referring to FIG. 6, any failed component which has one or more redundant counterparts may be removed, step 95, without disrupting the operation of the network or system, thereby allowing end-to-end continuous connectivity. (In addition, each network interface module preferably is designed with separate I/O and logic modules so that a main logic module can be removed without having to disconnect any cables.) Each module can automatically self-configure itself when inserted into a backplane of the BES, step 97, to minimize the possibility of configuration errors or system failures. Bandwidth on the system bus preferably is dynamically allocated/deallocated to cards which are "hot swapped." This feature of the BES does not require the system to be stopped or a trained operator to be involved in card removal/replacement.

The BES typically has an interface to support a dial up modem to accommodate remote operator access for troubleshooting operations.

To alert a network operator that a failure has occurred in the system, the BES may support a comprehensive set of internal and external alarms. Internal alarms can be displayed at a network management console or control terminal screen to identify a failed component or module. External alarms can be located at the physical network node (i.e., computer) and may consist of a set of LEDs located on each of the processor boards to indicate its status. Such a comprehensive alarm reporting system allows a network operator to react quickly to problems and take corrective action.

Figure 7:
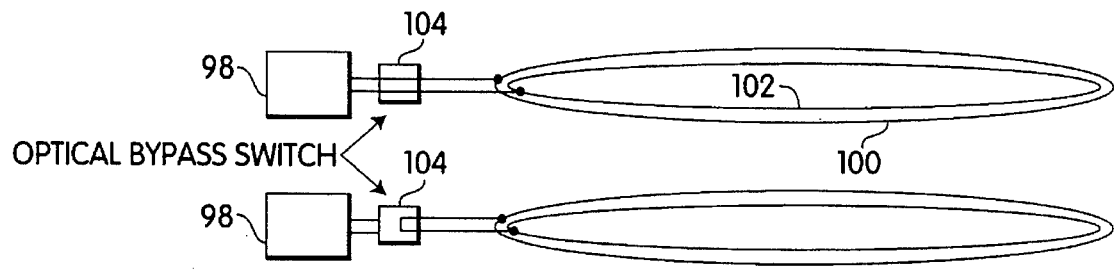
FIG. 7 is a diagram of a broadband enterprise switch including an optical bypass switch.

Referring to FIG. 7, a BES 98 might include a dual attachment FDDI interface module to accommodate a redundant FDDI ring configuration. Typically, in a redundant FDDI ring, a fault condition or failure which disables a main FDDI ring 100 results in traffic being switched to a backup FDDI ring 102. The BES can include an optical bypass switch 104 to further increase the reliability of the redundant FDDI ring. Thus, if a station attached to the FDDI ring fails, the optical bypass switch simply detaches the station, thereby keeping the ring topology intact.

To avoid costly equipment, line, and management overlap, the BES preferably is a single, modular device having a range of connectivity services for LANs and WANs. The BES may support both bridging and multiprotocol routing in order to interconnect virtually any LAN technology. With LAN-to-LAN and LAN-to-WAN internetworking, both department-level and enterprise-wide network applications can be handled. Because the BES may support all of the major LAN and WAN standards, it allows an organization to fully utilize its existing equipment and takes advantage of the tariff economics of public service offerings such as frame relay. In short, the BES is designed to accommodate existing and emerging services and standards to meet known network requirements and to support migration to new and/or emerging technologies such as SONET and ATM.

In the disclosed embodiment, the design of the BES is modular to support the addition of new modules/cards as network growth demands. These modules include both LAN and WAN network interfaces as well as electronic processor modules, which may provide increased performance and redundancy. The BES is designed to be an extendable platform in order to accommodate network growth.

Figure 8:
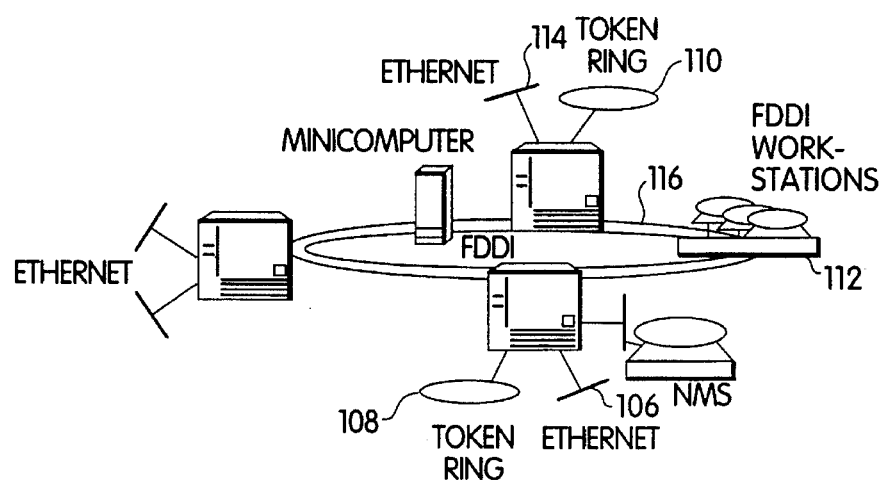
FIG. 8 is a diagram of a variety of local area networks interconnected by several broadband enterprise switches.

In the LAN environment, the BES can provide transparent interconnection of multiple dissimilar and/or similar LANs (without proprietary encapsulation). The BES can support industry standard IEEE 802.3, Ethernet 2.0, IEEE 802.5, and ANSI X3T9.5 FDDI networks, and, as one of ordinary skill in the art will appreciate, may be adapted to support other standards. Referring to FIG. 8, packet translation between, for example, Ethernet 106 and Token Ring 108, Token Ring 110 and FDDI 112, and Ethernet 114 and FDDI 116 may be performed to allow users of such dissimilar LANs to transparently exchange data in both bridge and router applications. The BES might bridge and route all major protocols between Ethernet, Token Ring, and FDDI networks. The BES preferably supports the IEEE 802.1d Spanning Tree protocol for transparent bridging as well as Source Routing and Source Routing Transparent bridging. The network layer (layer three in the OSI model) routing protocols supported preferably include TCP/IP, Novell's IPX, DECnet IV, and AppleTalk II. One of ordinary skill in the art will realize that the BES can be made to support other bridging and/or routing protocols.

Figure 9:
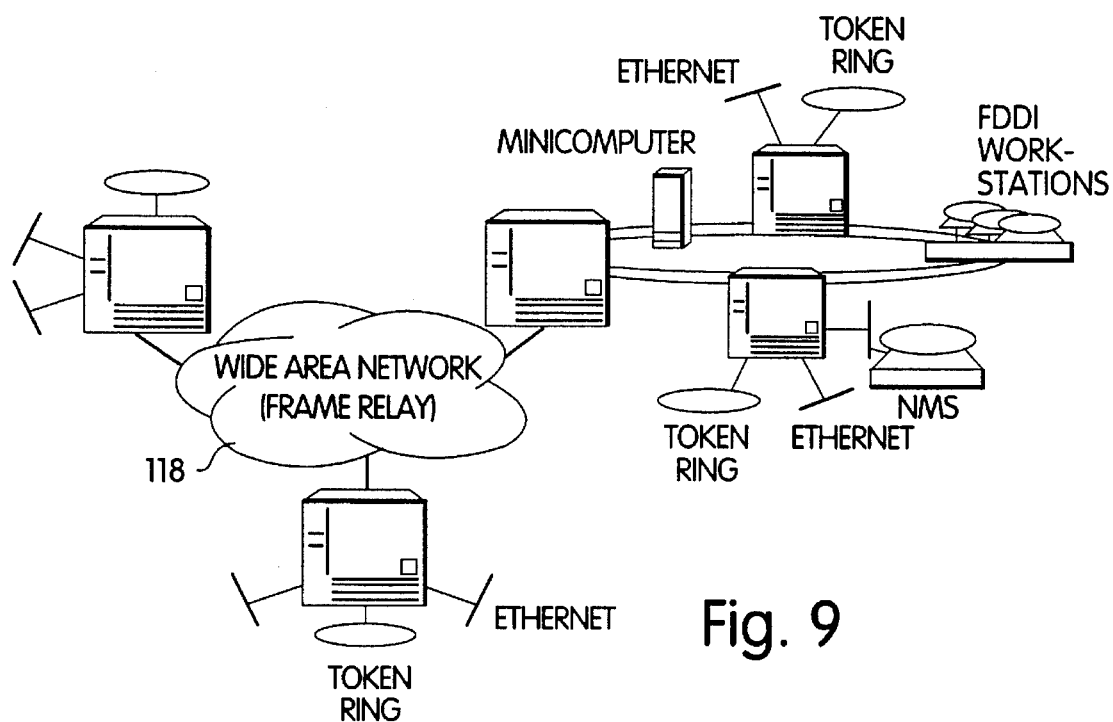
FIG. 9 is a diagram of a system using frame relay communication.

In the WAN environment, the BES preferably provides multiple T1 (D4 and ESF framing), E1 (CCITT G.703, 704), and DS3 standard interfaces for linking remote LANs and campus networks together. The T1 interface integrates a CSU function, thus minimizing the number of devices required in the network. Referring to FIG. 9, the WAN interfaces may fully support the CCITT and ANSI frame relay standard 118 for access to public data networks. LAN bridge and router traffic transported across the frame relay interface is fully compatible with the IETF "Multiprotocol Interconnect over Frame Relay" RFC (RFC 1294) for multi-vendor networking.

The BES preferably implements a Simple Network Management Protocol (SNMP) and an extended Management Information Base (MIB), MIB I and MIB II. Through standard node resident SNMP agents, BES nodes can be managed as an integral part of a multi-vendor enterprise wide network by a number of third party SNMP-based network management systems. Through extensions to the SNMP MIB, information can be collected describing every element of the BES network including all supported network-layer protocols and network circuit types. Information is provided on IPX, DECnet, AppleTalk, TCP/IP, FDDI, Ethernet, Token Ring, T1, E1, and DS3 (information on others known to those of ordinary skill in the art may also be provided). The result is centralized management of all local and wide area network elements supported by the BES.

In the disclosed embodiment, the BES includes an integrated and intelligent architecture which reduces the cost and complexity of managing an evolving enterprise network. Because the BES preferably supports multiple dissimilar and/or similar LAN and WAN services, network applications may be consolidated on a single product platform thereby eliminating the requirement of having to finance and maintain multiple devices to meet corporate internetworking requirements. Intelligent, self-healing network operation features of the BES can reduce the resources (and therefore the costs) required to operate and maintain a corporate network.

In general, a BES according to the invention can integrate bridge and router functions in order to design and manage an internetwork that best supports the structure of an organization and not the physical location of network users. This capability (discussed in more detail later) eases the task of administration and management by, for example, simplifying network configuration, accommodating topology changes more easily, and providing optimal performance to users.

LAN Services: BES Bridging Capabilities

The BES may support simultaneously the functions of a Transparent Bridge (using IEEE 802.1d Spanning Tree), a Source Routing Bridge, and a Source Routing Transparent (SRT) Bridge while operating at a filtering and forwarding rate of approximately 400,000 pps. The FPSE 62 (FIG. 3) updates a forwarding table of all learned address entries (e.g., up to 8191) which is controlled and maintained by the MAP 64 (FIG. 3). The BES bridge supports user-configurable aging of addresses; if any address has not been heard from in the aging time period, it is automatically deleted from the forwarding table. The BES bridge makes forwarding decisions based on information in the packet header and, depending on the information, either forwards the packet to an output port, floods it to multiple output ports (referred to as multicasting), discards it, or sends it the Router Engine 66 (FIG. 3) for network layer (layer three in the OSI model) forwarding.

The BES bridge provides a flexible method for filtering a variety of traffic according to the destination address, multicast address, or protocol type. These filters are user-configurable on a per interface (port) basis.

Figure 10:
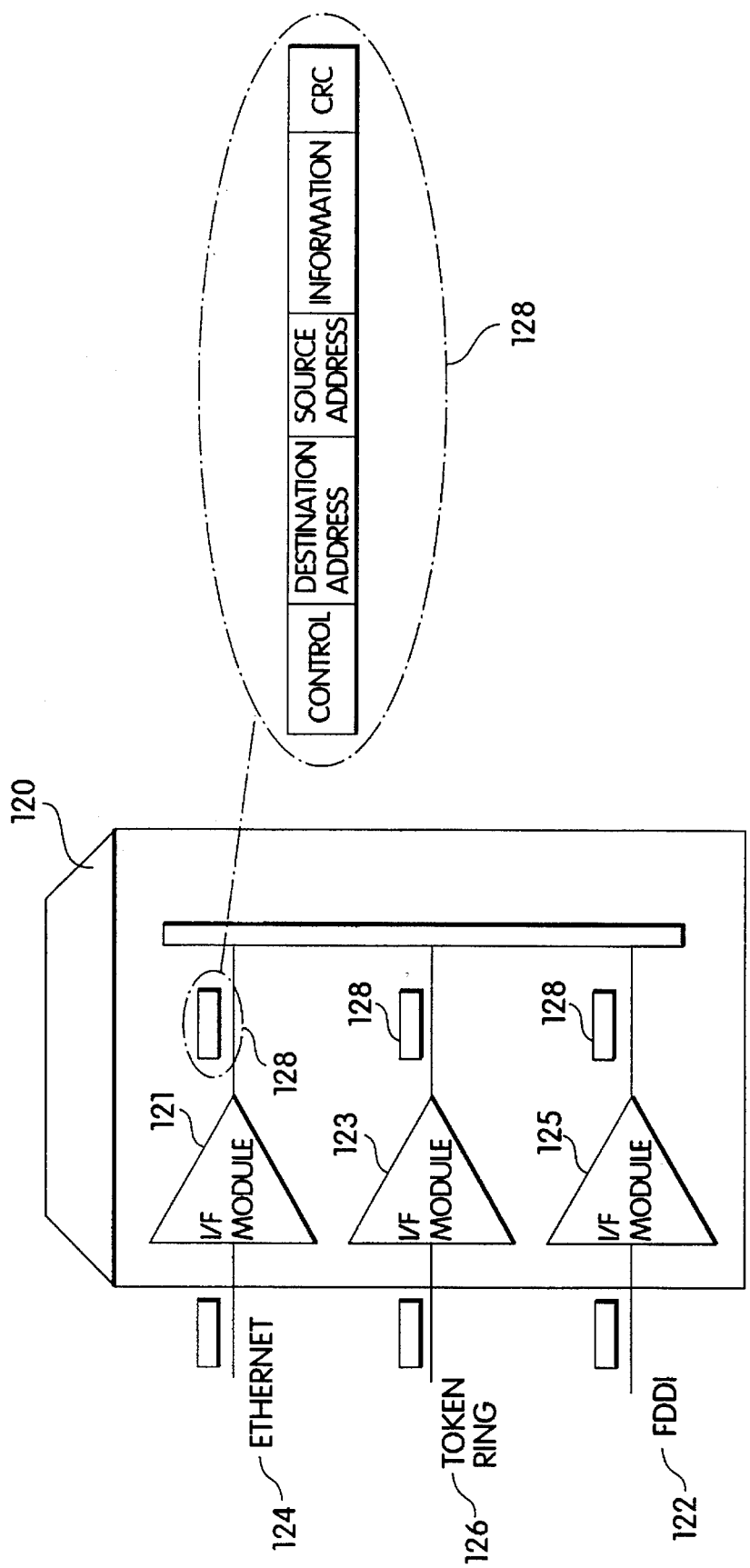
FIG. 10 is a diagram showing the generation of an internal packet used in a broadband enterprise switch.

Referring to FIG. 10, a BES 120 preferably supports protocol translation between FDDI 122 and Ethernet 124, Ethernet 124 and Token Ring 126, and FDDI 122 and Token Ring 126 networks but also may support translation between other standards, as mentioned previously. All incoming LAN packets typically enter the BES via network interface modules 121, 123, and 125 (labeled "I/F Modules" in FIG. 8). The packets preferably are converted into a BES internal format 128 at the network interface module/port regardless of the destination or source LAN type. The conversion includes recalculating the Frame Checksum (FCS) information from the incoming packet and prepending an internal BES header and appending an internal BES trailer including an internally-computed FCS to ensure data integrity within the system. After the packet has been processed by the BES, the output network interface port strips off the internal information and rebuilds the appropriate LAN headers and FCSs according to the packet format used by the destination network.

LAN Services: BES Routing Capabilities

The BES may support known network layer (layer three in the OSI model) protocols such as TCP/IP, Novell's IPX, Apple Talk Phase II, and/or DECnet Phase IV. The BES may be adapted to support other protocols, and a person of ordinary skill in the art would know how to modify the BES to achieve support of a variety of other protocols.

The Router Engine 66 (FIG. 3) preferably performs the network layer forwarding with an aggregate forwarding rate of at least 25,000 pps. The Router Engine receives packets from the FPSE 62 (FIG. 3) that have been identified for routing. The Router Engine also maintains a routing database which is shared with and maintained by the MAP 64 (FIG. 3).

The BES TCP/IP router may be compliant with various Request For Comments (RFCs). The BES may support the dynamic routing capabilities available with gate D which includes RIP, EGP, BGP and OSPF (all are terms known to those of ordinary skill in the art), but the BES also may support static routing. Static routing can allow an operator to explicitly define a route for a particular address instead of learning the route through RIP, EGP, BGP, or OSPF. The BES also may support the ability to automatically generate a default route when using EGP or BGP. Traffic management and control can be facilitated using network layer filters which are configurable on a per interface basis. The BES may forward or discard packets based on the source address and/or the destination address. The BES also might support route update filters which control the sending and receiving of route updates in the network to reduce overhead traffic.

The BES IPX router preferably fully conforms to the Novell Internet Packet Exchange Protocol (IPX), Routing Information Protocol (RIP), and the Service Advertising Protocol (SAP). The BES also may support user-defined static routes and Novell's implementation of NetBIOS. Traffic management and control can be facilitated using interface specific filters for routing updates, NetBIOS broadcast packets, and IPX packets. The IPX traffic filters can be based on source address and/or destination address as well as packet type. To further reduce overhead traffic in the network and minimize congestion, the BES IPX router may support user-configurable broadcast times for SAP and RIP updates. These broadcast times typically are configurable on a per interface basis. Ethernet, 802.3, 802.2 (LSAP), Novell, and SNAP encapsulation all can be supported for operation over different network media.

The BES AppleTalk router preferably complies fully with AppleTalk Phase II and is capable of operating in both EtherTalk and TokenTalk network environments. The BES AppleTalk II router preferably supports the Appletalk Address Resolution Protocol (AARP) as well as the Datagram Delivery Protocol (DDP), Routing Table Maintenance Protocol (RTMP), Name Binding Protocol (NBP), AppleTalk Echo Protocol (AEP), and the Zone Information Protocol (ZIP). Traffic management and control is facilitated using filters, which are configurable on a per port basis.

The BES DECnet router preferably complies with DECnet Phase IV. Routing in DECnet Phase IV is hierarchical, allowing a large network to be partitioned into logical groups of nodes called Areas. The BES DECnet router preferably is a Level 2 router supporting both routing within an Area and routing between different Areas.

LAN Services: BES Integrated Bridging and Routing Capabilities

It typically is possible for internetwork users to realize acceptable network performance if a network server is placed on the same physical LAN segments as the users because this results in better response times and reduced traffic in the internetwork. However, as users move and as servers are added, the internetwork often needs to be partitioned into more segments to expand the capacity. This re-segmentation not only forces the network administrator to go through the process of regenerating routing tables and numbering plans, but in addition makes it almost impossible to optimize the placement of servers within the internetwork. This problem further increases as new servers are installed for different protocols, such as Novell servers for IPX, VAXs for DECnet, and Sun servers for TCP/IP, each of which may have overlapping groups of users from several LAN segments. The result is an overly complex network which is difficult to manage and administer, and for which it is difficult to diagnose reliability and performance problems.

The BES is adapted to combine both bridging and routing functions in a single device in order to design and manage an internetwork that best supports workgroups or common-interest groups.

Figure 11C:
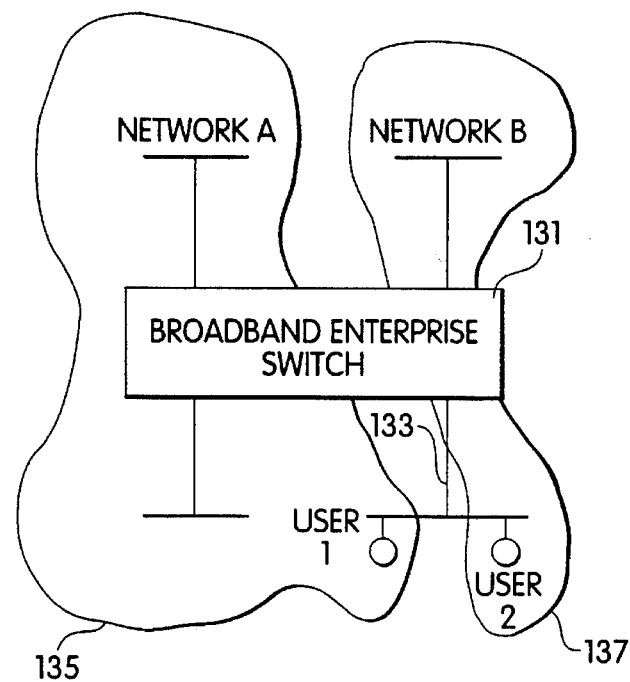
FIGS. 11A, 11B, and 11C are diagrams illustrating a "logical" (or "virtual") network feature of a broadband enterprise switch according to the invention.
Figure 11B:
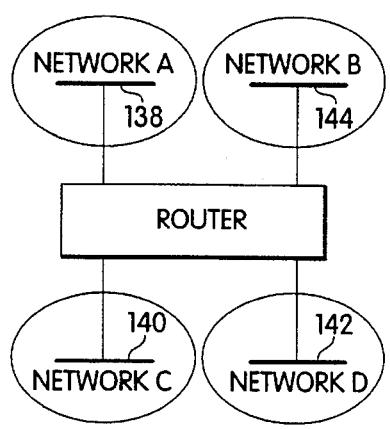
Figure 11A:
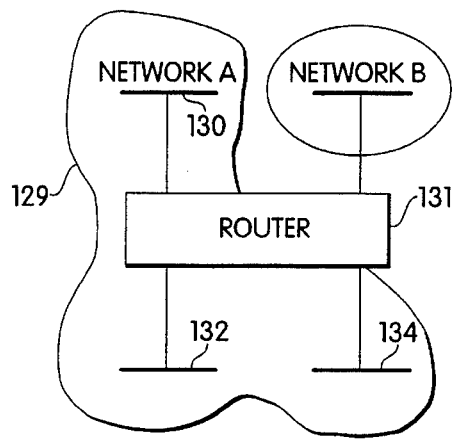

Referring to FIGS. 11A and 11B, in the disclosed embodiment, a BES 131 according to the invention has the addressing flexibility to allow the network administrator to define a "logical" (or "virtual") network 129 (or multiple logical networks) that spans multiple, contiguous, physical LAN segments 130, 132, and 134. In addition, referring to FIG. 11C, users on the same physical LAN segment 133 can belong to different logical networks 135, 137. This is in contrast to known configurations in which the logical network configuration mirrors the physical network structure, and networks (or subnetworks) correspond directly to the physical LAN segments 138, 140, 142, and 144. In a BES network, groups of users spanning multiple physical segments can be configured as single logical networks regardless of their geographic location (FIGS. 11A and 11C). The BES design thus can allow users to take advantage of the performance and transparency benefits of bridging and the security and management of routing.

Figure 12:
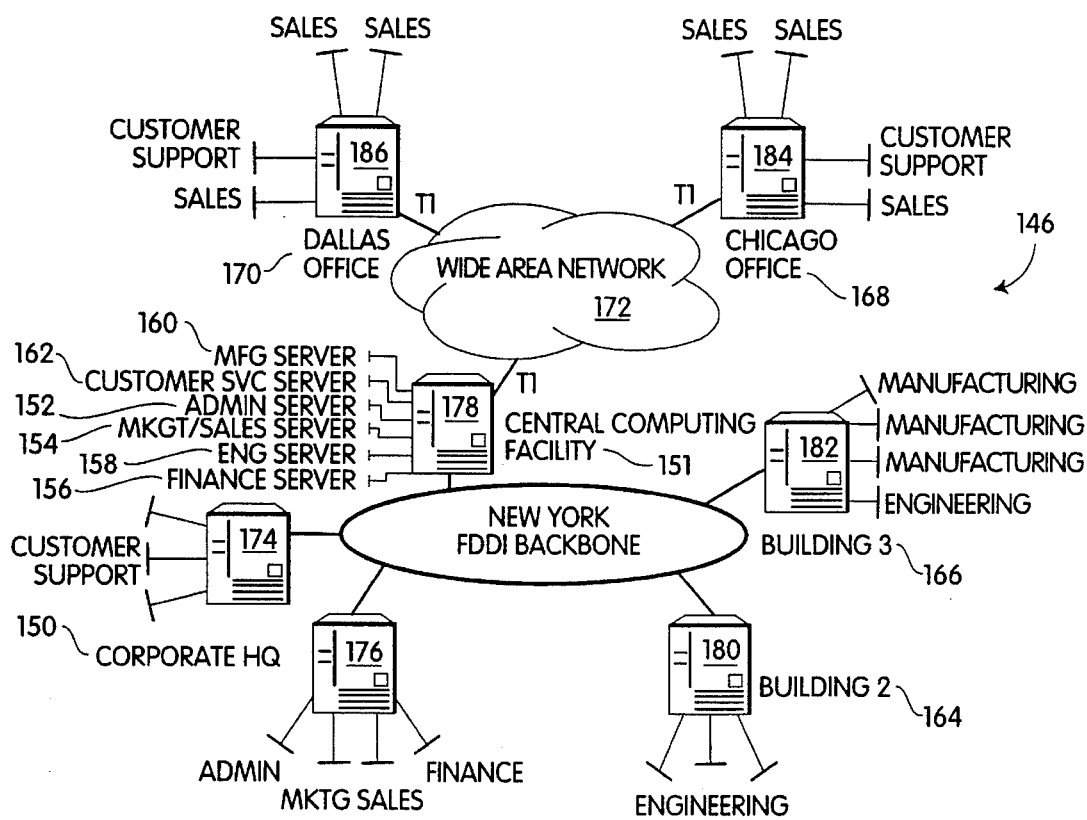
FIG. 12 is a diagram of another embodiment of a broadband enterprise switch network according to the invention.

Referring to FIG. 12, a BES network 146 might include five geographically-separated sites which are interconnected by a common network backbone 148. A corporate headquarters 150 might house a central computing facility 151 which may include LANs for each of the main departments such as corporate administration 152, sales and marketing 154, finance 156, engineering 158, manufacturing 160, and customer support 162. For reasons of security and protection, each department's file server typically resides on a "server LAN" within the central computing facility 151. A separate engineering facility 164 (Building 2), a separate manufacturing facility 166 (Building 3), and two field offices 168, 170 for sales and customer support personnel (Dallas and Chicago) might be connected to the headquarters 150 across a WAN 172.

This structure is typical in many of today's organizations, where departments are located in several geographically-dispersed locations. The majority of traffic typically flows within a department. Typically, less traffic flows between departments. Departments often need to secure access to information such as sensitive financial or personnel records.

The BESs 174, 176, 178, 180, 182, 184, and 186 in the network 146 allow each geographically-dispersed department to be associated with the same logical network; intra-departmental traffic can flow at the data link layer (either directly or bridged) and inter-departmental traffic can be routed between BESs.

Thus, the BES can provide the ability to configure a network coincidental with the structure of an organization. This ability permits the network administrator to exploit the strengths of both bridging and routing. Because most of the traffic is intradepartmental and intra-departmental traffic may be relayed at the data link layer, users within a department experience better performance when accessing their servers. Because most of the traffic is intra-departmental and relayed at the data link layer, the internetwork is less likely to experience congestion and delays across routed paths which tend to support less throughput compared to bridged paths. Because inter-departmental traffic is routed at the network layer (layer three in the OSI model) and access control policies can be implemented more effectively at the network layer, the network administrator is able to provide inter-departmental "firewalls." From an administrative perspective, when all users within a department belong to the same logical network, the network configuration is simplified and network topology changes are accommodated easily. For example, if a user moves his PC from one office floor to another to connect to a different physical LAN that is part of the same logical network, the PC does not need to be reconfigured as it would need to be if a known internetworking device were being employed.

In the example of FIG. 12, if the network were configured using a traditional router topology, a one-to-one correspondence between physical segments and logical networks would exist and a plurality of separate networks (e.g., thirty) would result. Additionally, the majority of intra-departmental traffic would flow across low throughput routed paths and network congestion would likely result. With the BES network 146, each department can access their server via bridged paths, providing better response times and higher utilization. Also, with the network 146, only seven logical (or virtual) networks are required (corresponding to the number of departments), greatly reducing the management and administrative overhead of managing multiple networks.

WAN Services: BES Frame Relay

The BES preferably supports T1, E1, and DS3 interfaces for linking remote LANs and campus networks across a wide area backbone network. Other interfaces also may be supported. For public network compatibility, the T1 and E1 links may support a data networking protocol standard such as frame relay.

Figure 13:
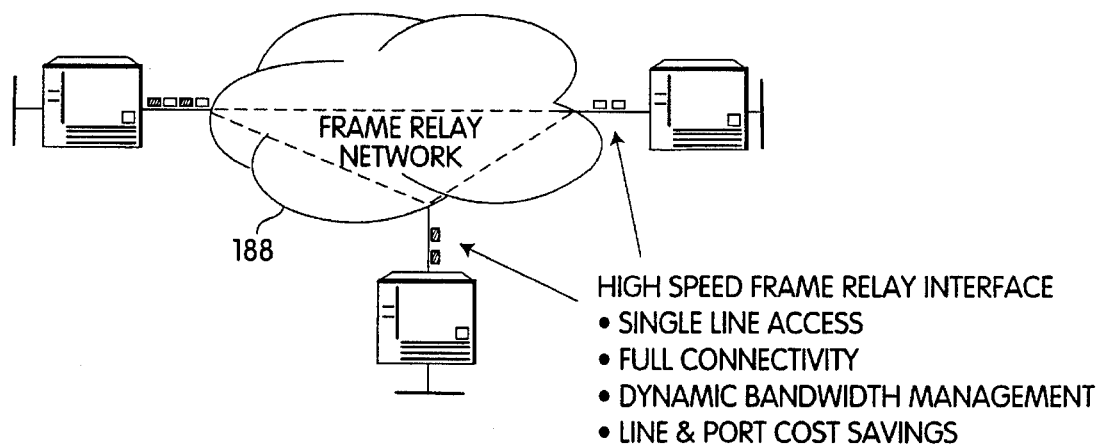
FIG. 13 is a diagram of a frame relay interconnection of broadband enterprise switches.

Referring to FIG. 13, in the disclosed embodiment, the BES frame relay implementation is as a frame relay access device (or DTE) with an interface to a frame relay backbone network 188. This BES frame relay interface is supported at T1 and E1 speeds for access into today's public or private frame relay networks, as well as at DS3 speeds for emerging high speed network applications. The interface is fully compatible with emerging CCITT and ANSI standards and supports the Local Management Interface (LMI) protocol to provide status information about each virtual connection. The BES LMI conforms to both the ANSI Annex D and the earlier Consortium version.

Each BES frame relay interface port can support up to 250 DLCIs (or virtual connections) for connection to multiple destinations. For multi-vendor interoperability, the implementation also can support both bridge and router traffic encapsulation as defined by the IETF "Multiprotocol Interconnect Over Frame Relay" RTC. The interface may provide congestion control by responding to a Backward Explicit Congestion Notification (BECN) bit. In the event the network sets BECN, the BES may buffer packets until the congestion condition is cleared.

BES Architecture: Overall System

Figure 14:
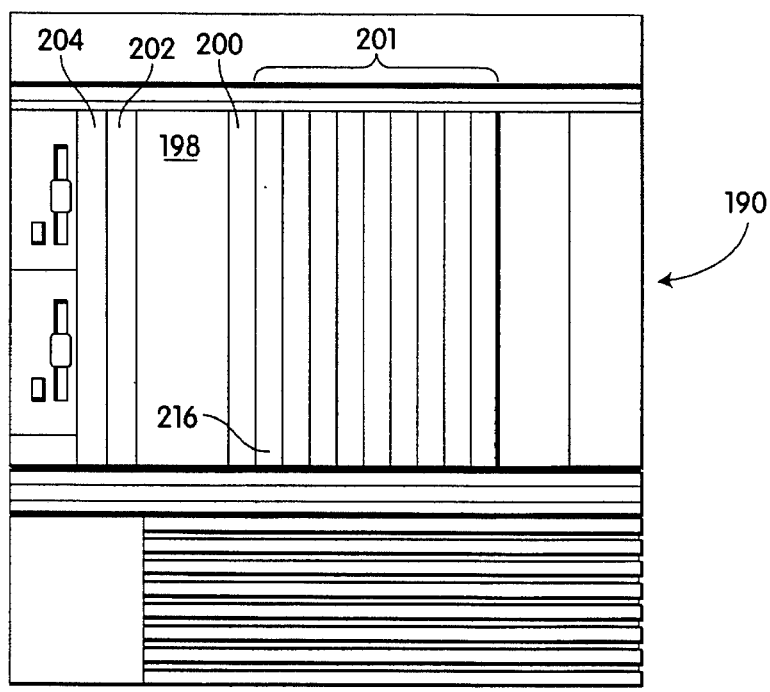
FIG. 14 is a diagram of a broadband enterprise switch in a rack-mount form.

In the disclosed embodiment, the BES (currently available as model CX1600 from Coral Network Corporation, 8 Technology Drive, Westborough, Mass. 01581) is a network backbone node supporting full redundancy (redundancy is available as an option with the model CX1600). As shown in FIG. 14, a BES 190 may be available in rack-mount form and have a plurality (e.g., sixteen) of card slots available. Some (e.g., six) of the card slots might be reserved for disk and processing modules, and the remaining (e.g., ten) slots might be filled with any combination of network interface modules, additional processing modules, and/or redundant modules. The actual number and types of cards used will depend on and be determined by a particular user's specific internetworking requirements.

A fully redundant system bus preferably may be included as part of a standard BES configuration. The BES may be optionally configured with redundant power, processing cards, and/or network interface cards. For redundancy, all hardware components of a given type might be backed up by a single additional component of the same type. This type of redundancy preferably always is supported for the WAN network interface modules. In the event of a failure, the redundancy allows a backup component to be automatically switched into service. The BES preferably supports "hot" insertion and removal wherein all cards, power supplies, fans, etc. can be added or replaced while the BES is operating (i.e., "online") without any detrimental impact on the operation of the BES and without a user perceiving a "glitch."

Referring back to FIG. 3, the system level architecture of a BES node 192 generally is identified, and each of the major hardware modules are shown (power supplies and disk drive modules are shown in FIG. 14). The hardware modules can be divided into two main groups: the packet processing modules 60 and the network interface modules 58. The packet processing modules 60 can perform all of the LAN packet filtering, forwarding, and routing as well as the overall system monitoring. The network interface modules 58 can support the physical WAN and LAN network interfaces to and from the BES and generally manage the traffic input and output. The packet processing modules 60 might include the FPSE 62, the Router Engine 66, and the Maintenance & Administration Processor (MAP) 64. The network interface modules 58 might include the FDDI Station Module 80, the Ethernet Module 78, the Token Ring Module 82, the T1 Module 84, the E1 Module 84, and the DS3 Module 86. Other modules are possible.

BES Architecture: System Bus/Backplane Design

The main system bus preferably is an 800 Mbps nonblocking bus. The bandwidth (e.g., 800 Mbps) of the bus can be divided up and allocated (e.g., via time division multiplexing) into data channels and control channels.

In the disclosed embodiment, each network interface in the system is allocated a fixed amount of bus bandwidth for data transmission which is directly proportional to the attached network's native speed. For example, an FDDI interface card might be allocated 200 Mbps of bus bandwidth to provide a 100 Mbps data channel for data transmitted to the FDDI network and a 100 Mbps channel for data received from the FDDI network. Similarly, bandwidth is allocated to each Ethernet, Token Ring, T1, E1, and DS3 network interface in the system.

The bandwidth allocation preferably is performed dynamically in that the BES is capable of determining what network a particular network interface module/card supports and allocating the appropriate amount of bandwidth to that card even if the card is inserted while the BES is operational (i.e., even if the card is "hot swapped").

Bus bandwidth also can be allocated for control and management information passed between the MAP 64 (FIG. 3) and each of the network interface modules 58 (FIG. 3) and switch processors (the FPSE and the Router Engine). The control bandwidth may be used to report card status information back to the MAP and for downloading software to the cards. The control bandwidth generally contributes to the BES's ability to detect and react to failed hardware components.

Figure 15:
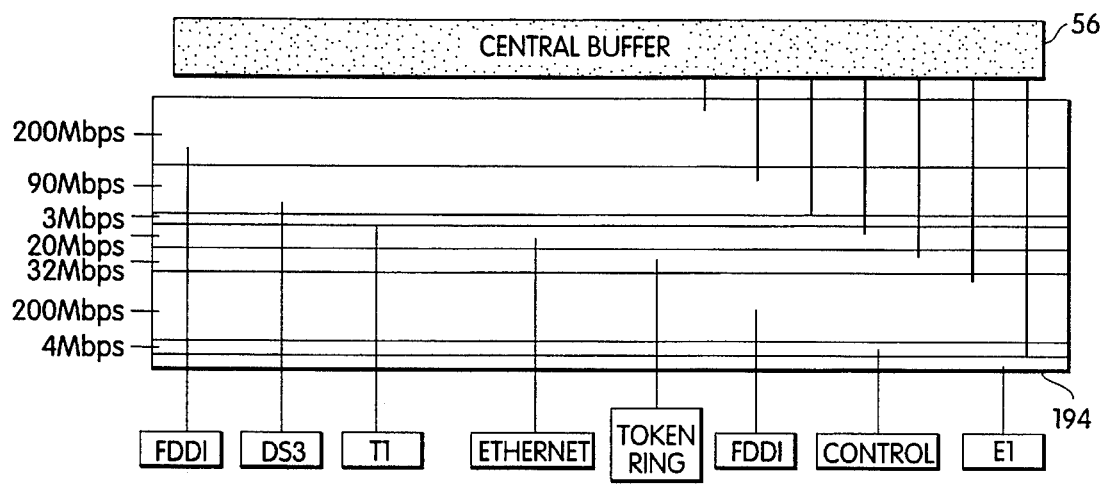
FIG. 15 is a diagram of one possible bus bandwidth allocation in accordance with the invention.

An example of a particular bus bandwidth allocation is shown in FIG. 15, which is similar to FIG. 2. Referring to FIG. 15, the various bandwidth allocations of the bus 194 are associated with the various networks shown. In the disclosed embodiment, the traffic in each bandwidth allocation is transferred to the central buffer 56 which preferably has the same bandwidth as the bus (e.g., 800 Mbps).

All modules/cards which connect to the system bus preferably include a Data Port Interface Chip (DPIC) to provide a standard, card-independent interface to the system bus. In the disclosed embodiment, the DPIC is a custom interface, realized as a single ASIC, to implement a backplane and canonical frame representation. There are four bi-directional channels: control, two data, and synchronous. Control channels are used between the Active MAP and all other cards, and to keep a card from being forced into the resent by a local watchdog timer. There is one outgoing and one incoming control channel between the Active MAP and each other Card, and one for every card in the system not held in reset. Data channels implement a canonical frame. They have 16 bit data paths, and are usually connected to a DMA controller on their card. Data channels assume a contiguous address range for the extent of a transfer count field. However, multiple buffers per frame (a scatter or gather operation) may be implemented by programming the channel accordingly. On data channels, the appropriate bus tag bits are generated by the DPIC. Data channels have the capability to bit reverse generated by the DPIC. Data channels have the capability to bit reverse source and destination Media Access Control (MAC) addresses. The synchronous channel is a byte interface for high speed transfer. It strips canonical fields when transmitting to a card and expects them to be provided externally on receiving data from a port card. Outside the DPIC are two independent sets of bus transceivers. Each is for different bus data. The bus used is controlled by the active MAP. The rest of the cards in the system may only report which buys is being used from its perspective.

In the disclosed embodiment, a backplane of the BES operates at 25 MHz and can deliver a data word every 40 nanoseconds. There are 32 bits of data in a word, qualified by 4 mode and 4 tag bits accessed by an 8 bit source and 8 bit destination. Allocation of the bus bandwidth is done by time division multiplexing. There are 4096 slots in a complete cycle of a TDM table. The backplane bandwidth capacity is 800 Mbits/Second. Each time slot is 1/4096 of 800 Mbps or 195,000 bits per second. Tag fields delimit the packet and a mode field denotes the transfer type. In general, the bottom 5 bits of the source and destination field denote a DLP Queue number for data modes. The upper 3 bits designate whether the address is a circuit, an active DLP, a backup DLP, or other card. For control, the bottom 4 bits denote the card slot number and the next two bits are always set for the 1600, and the top 2 bits are 0. There are a few notable exceptions: (1) the Active MAP is address 0 for control and 0 in the TDM table, (2) the Active MAP is address 31 for data and OxFF in the TDM table, (3) the Backup MAP is address 1 for control and Ox31 in the TDM table, and (4) the Backup MAP is address 30 for data and OxFE in the TDM table. Data is transferred by synchronous handshake, implemented by two bits— Valid and Taken. An available word is presented with a set valid bit. If it is transferred, the destination asserts the Taken bit when copying. The bus is organized around a pipeline delay of five clock ticks. This means that the source and destination of a transfer are driven on the bus and known to all interfaces five clock ticks ahead of the time of actual data transfer.

BES Architecture: Packet Processing Modules

One of the packet processing modules is the Fast Path Switching Engine (FPSE), which can be the three-slot card 198 labeled SWITCH in FIG. 14. The FPSE preferably controls all of the LAN-sourced traffic in the BES. The FPSE can perform the high speed (e.g., approximately 400,000 pps) filtering and forwarding of LAN data packets.

In the disclosed embodiment, incoming data packets are taken from the non-blocking system bus and buffered in the central buffer (FIGS. 2 and 15) which is part of the FPSE. The FPSE then filters the header information of the packets and switches the packet to the appropriate output network interface. The FPSE also makes the decision of whether a data packet should be routed or bridged. Any routed packets are sent over the system bus to the Router Engine for processing.

The FPSE preferably performs all of the buffering, queuing, filtering, and forwarding in hardware using discrete components such as FIFOs, SRAMs, DRAMs, CAMs, and Programmable Array Logic (PAL). Because the PALs are designed and dedicated to perform only these functions, the FPSE performs its functions extremely fast. The FPSE may include 4Mbytes of central buffer storage. The central buffer preferably operates at the same speed as the system bus (e.g., 800 Mbps) and stores each received packet. The central buffer may perform speed matching and congestion control functions. Each network interface port is allocated a fixed portion of the central buffer to prevent a single port from flooding the entire system when congestion occurs. The central buffer preferably can receive packets from up to 31 ports and can transmit packets to up to 31 ports simultaneously.

In the disclosed embodiment, the FPSE supports transparent bridging, source routing, and source routing transparent (SRT) bridging. It complies fully with the IEEE 802.1d Spanning Tree Algorithm. The FPSE maintains a table of all learned Media Access Control (MAC) addresses (e.g., up to 8191). The table is controlled by the Maintenance & Administration Processor (MAP). In response to user-configured parameters, the FPSE forwards or discards (i.e., filters) frames on the basis of, for example, the destination address, multicast address, or protocol type.

The FPSE also may gather detailed statistics for each source address in the network including the number of packets and the number of bytes sent and received. This information can be analyzed as required to produce management reports and billing detail using third-party application packages. In the disclosed embodiment, the FPSE occupies three card slots 198 in the rack-mount BES of FIG. 14. A second three-card FPSE can be added as a hot standby to provide 1:1 redundancy.

Referring to FIG. 3, in the disclosed embodiment, the FPSE 62 (which is also referred to as the DLP) is divided into three functional areas: Buffer 56, Queue 55, and Filter 218. The Buffer 56 contains a 4Mbytes of packet storage, managed as 16K 256 byte buffers. The Queue 55 allows the DLP to manage the buffer memory as multiple link lists for up to 31 destination queues. Data enters the DLP multiplexed in time for up to the 31 queues. Data is demultiplexed into individual canonical frames in the Buffer and the header, MAC addresses, and trailer are simultaneously offered to the Filter 218 to determine how to switch or dispose of the frame. The Filter 218 implements may of the 802.1D MAC bridging requirements including packet forwarding, static addresses, Filtering, and learned addresses as well as other features such as Prerouting and per port byte/frame forward counts. There are two Forwarding tables which contain a maximum of 8191 entries. This allows the MAP to operate on the Backup while the Active is in use. The tables must be sorted by magnitude as the DLP employs a binary search. Each entry may be dynamic or static. The DLP records activity for each dynamic entry to assist the MAP in timing out old entries. Static entries may be tagged as forward, flood, or filter. There are two new address tables with an associated CAM (content addressable memory) to new allow addresses to be learned while the MAP is draining the current set of new addresses. There is a hardware threshold on the maximum number of frames (256) allowed on an output queue. There is also a timeout value, controllable through the control register, to age-out packets not removed by the output queue. The DLP is managed by the MAP. On expiration of a periodic timer, the MAP checks the DLP for new addresses, updates byte and frame counts for every valid address, and determines whether an address has been timed out. The DLP is accessed over the control bus by a set of commands. In general, control operations are a single write while data reads and writes take a set of operations to perform. A software interface to the DLP may exist.

Another of the packet processing modules is the Router Engine, which can be the one-slot card 200 labeled ROUTING ENGINE in FIG. 14. The Router Engine may be used to complement the FPSE and perform all of the multiprotocol routing at rates in excess of 25,000 pps. If used, the Router Engine can support the network layer (layer three in the OSI model) forwarding of a plurality of protocols including TCP/IP, Novell IPX, AppleTalk II, and DECnet IV.

In the disclosed embodiment, the Router Engine receives packets from the system bus that have been identified for routing and have been forwarded by the FPSE. The packets are processed by the Router Engine and then transmitted over the system bus to the appropriate network interface module. The Router Engine maintains a routing database which is controlled by the Maintenance & Administration Processor (MAP). The Router Engine is based on a 33 MHz Intel 80960 RISC processor, it has 4MBytes of memory, and it occupies a single card slot 200 in the rack-mount BES of FIG. 14. An additional Router Engine can be added to provide 1:1 redundancy.

Another of the packet processing modules is the Maintenance & Administration Processor (MAP), which may be the one-slot card 202 labeled MAP in FIG. 14. The MAP can have a 16 MHz Intel 80960 RISC processor which monitors and controls the overall operation of the BES node and communicates with a SNMP-based network management system. The MAP also may have 4MBytes of memory.

The MAP preferably interfaces with each of the cards in the system (e.g., the network interface modules, the FPSE, and the Router Engine) to monitor their status and to perform software downloads when required. The MAP also preferably builds and maintains a table which describes how the system bus bandwidth (e.g., 800 Mbps) is divided up (i.e., allocated) between data and control channels.

For LAN bridging, the MAP can complement the FPSE and provide the intelligence to build and maintain bridge forwarding tables which might have a maximum of 8191 entries. The MAP may collect the statistical information forwarded by the FPSE including the number of bytes and frames sent and received. Additionally, the MAP might perform loop detection and port enable/disable functions required to support the Spanning Tree Algorithm and an address aging function.

The MAP routing functions can include the building and maintenance of routing tables which are shared with the Router Engine. The MAP preferably supports two Interior Gateway Protocols (IGPs) which provide consistent routing information between TCP/IP stations on their local network: Routing Interior Protocol (RIP) and Open Shortest Path First (OSPF). The MAP also may support the Exterior Gateway Protocol (EGP) for TCP/IP stations on remote networks and the Border Gateway Protocol (BGP).

The MAP might house an SNMP node resident agent for communications with any SNMP-based network management system. The MAP may be equipped with an EIA232 diagnostic module for local terminal or dial modem attachment; this module can be configured so that an operator can remotely dial into (e.g., at speeds from 300 bps to 9600 bps) the BES node to perform troubleshooting operations.

In the disclosed embodiment, the MAP occupies a single card slot 202 in the rack-mount BES of FIG. 14. A second MAP card 204 can be added in hot standby for 1:1 redundancy.

Also, in the disclosed embodiment, the MAP provides the BES control functions and end-system connectivity. At the physical layer, it drives the active TDM table, provides the WAN clocking system, controls the serial modem card, and owns two floppy disks which contain identical information. The MAP is responsible for implementing redundancy throughout the BES, and collecting all management data. The MAP redundancy hardware is designed to switch control from a failing MAP to an operable MAP when two CPU clock periods. MAP hardware redundancy performs active to backup switchover and the restoration of the backplane clocks and TDM table in order that the watchdog timers on the individual cards do not expire. In a system with redundant maps, either board can disable itself or the other board upon detection of a failure. At switchover, the hardware automatically switches-in the redundant TDM table within a few CPU clock periods. The software must recognize this switchover and reprogram the DPIC to the values required by the Active MAP. Resetting the DPIC cuts off communications with other boards for a relatively long settling period; when complete the rest of the system resumes communication with the Active MAP without realizing the switchover has occurred.

As described previously (in the BES Architecture: System Bus/Backplane Design section), each packet processing module/card preferably includes a DPIC for providing a standard, card-independent interface to the system bus.

Other packet processing modules besides the FPSE, the Router Engine, and the MAP are possible. A person of ordinary skill in the art would know how to design other such modules and incorporate them into the disclosed BES system.

BES Architecture: Network Interface Modules

The network interface modules connect can be used to LANs, MANs, and WANs to the BES. In FIG. 14, a plurality of network interface modules/cards 201 are shown in the rack-mount BES.

Figure 16:
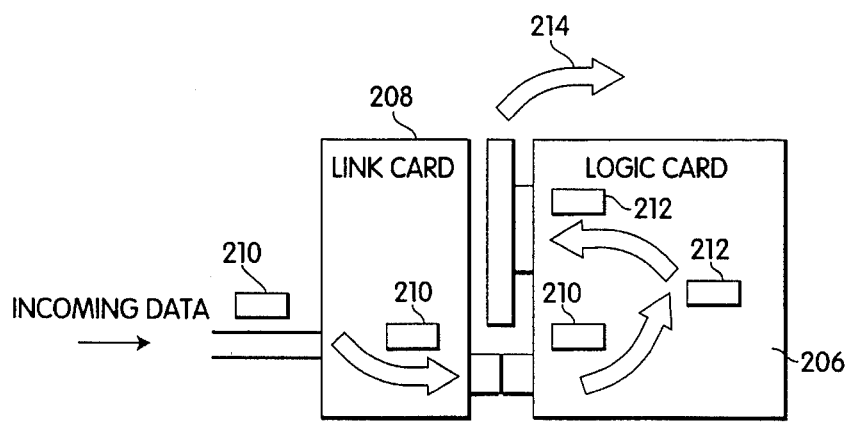
FIG. 16 is a diagram of two components which may be included in each network interface module of a broadband enterprise switch according to the invention.

Referring to FIG. 16, each network interface module typically includes two components: (i) a Logic Card 206 and (ii) a Link Card 208. The Logic Card 206 can be inserted and removed from the front of the rack-mount BES node (FIG. 12). In the disclosed embodiment, the Logic Card 206 manages all incoming packet traffic 210 by converting the incoming packets 210 to an internal packet format 212 for sending over the system bus 214. (The internal packet format was mentioned previously in the Overview section of this specification and also is described below in the BES Internal Packet Format section.) The Logic Card 206 also manages all outgoing traffic by converting the internal packet format 212 to the native network packet format 210 (e.g., to Ethernet, Token Ring, FDDI, or Frame Relay format). The Link Card 208 provides the actual physical interface to the specific network connected to the BES. Each Link Card 208 can includes a DPIC (Data Port Interface Chip), which was described previously.

One network interface module is an FDDI Station Module which might utilize the National Semiconductor FDDI chip set such that the FDDI station module complies fully with the ANSI X3T9.5 standard and operates over ANSI specified 62.5 micron multimode fiber. The FDDI interface of the BES may support a Dual Attachment, single MAC address connection to an FDDI ring for communications across dual counter-rotating fiber optic rings. As described with relation to FIG. 7, if a fault condition or failure disables the main FDDI ring, traffic can be transparently switched to the backup FDDI ring. Also, the BES may support (via an RJ45 connector) an optional, external optical bypass switch to further increase the reliability of the FDDI ring; if a station attached to the FDDI ring fails, the optical bypass switch simply detaches the station thereby keeping the ring topology intact.

The FDDI Station module can be fully compliant with the following physical and MAC requirements: (i) FDDI Token Ring, Physical Layer Protocol (PHY), X3.148; (ii) FDDI Token Ring, Physical Layer Medium Dependent (PMD), X3.16; (iii) FDDI Token Ring, Media Access Control (MAC), X3.139; and (iv) FDDI Token Ring, Station Management (SMT) X3T9.5/84-49 Version 6.2. It also may be compliant with other requirements.

The FDDI I/O Link Card may support standard FDDI dual-MIC (Media Interface Connector) fiber optic connectors, plus the interface for the external optical bypass switch.

Packets preferably are transmitted and received by the FDDI module at the full FDDI bandwidth (e.g., 100 Mbps which generally is a rate of about 390,000 pps).

In the disclosed embodiment, up to three active FDDI networks may be supported by the BES system, and each FDDI network may have up to 500 attached nodes. The FDDI station module occupies a single card slot, for example, slot 216 in FIG. 14. An additional card can be added for 1:1 redundancy. The redundant card can run in hot standby mode with the identical configuration of the primary card. In the event of a failure in the primary card, traffic will be routed to the standby.

Another network interface module is an Ethernet/802.3 module which might include a 25 MHz Intel 80960 RISC-based processor. The Ethernet module preferably has two ports. Each port preferably is capable of transmitting and receiving packets at the full Ethernet bandwidth (e.g., 10 Mbps). In the disclosed embodiment, the BES may support up to ten Ethernet modules, or, equivalently, twenty Ethernet networks. The Ethernet preferably is compliant with IEEE 802.3 and Ethernet 2.0, and the BES supports two different Ethernet input/output (I/O) Link Cards, one with dual AUI connectors for connection to external 10BASE5 transceivers and one with dual 10BASE2 BNC connectors. The Ethernet module occupies a single card slot in the rack-mount BES. An additional card can be added for 1:1 redundancy. The redundant card can run in hot standby mode with the identical configuration of the primary card. In the event of a failure in the primary card, traffic will be routed to the standby.

Another network interface module is a Token Ring module which may use an Intel 80960 RISC-based processor design and which may have two ports. In the disclosed embodiment, the Token Ring module is fully compliant with the IEEE 802.5 protocol standards, and it supports two Token Ring LANs which can be independently software-configured for 4 Mbps or 16 Mbps rates. Each port of the Token Ring module is capable of transmitting and receiving packets at the full 4 Mbps or 16 Mbps Token Ring bandwidth. The BES can support up to ten Token Ring modules, and these modules can support a maximum of twenty 4 Mbps Token Ring networks or fourteen 16 Mbps Token Ring networks. Additional cards can also be added (up to the twenty maximum) for 1:1 redundancy. The redundant card can run in hot standby mode, with the identical configuration to the primary card. In the event of a failure in the primary card, traffic will be routed to the standby.

Another network interface module is a T1 Module which might employ a 25 MHz Intel 80960 RISC-based processor. In the disclosed embodiment, the T1 module has up to four T1 interfaces at 1.544 Mbps with either D4 or ESF framing, and AMI or B8ZS line encoding. Each interface is configurable to support data rates from 56/64 Kbps up to 1,544 Mbps, in increments of 56 Kbps or 64 Kbps, and each is capable of transmitting and receiving at the full 1,544 Mbps bandwidth. The Ti interfaces can be configured to operate in channelized as well as unchannelized modes. Integral to the T1 interface module is a CSU capability for each port. Integration of the CSU allows the BES to connect directly to carrier lines without the need to purchase and manage external framing devices. The CSU supports the line interfaces for both D4 and ESF framing and provides error statistics and remote and local loopback operation.

The T1 interface may support the CCITT and ANSI Frame Relay protocol for connection to a public or private frame relay backbone network. Each T1 module may be economically configured for 1:1 or 2:1 redundancy for hot standby operation. In the event of a failure in an active card, traffic can automatically be switched to the standby. Up to ten T1 modules preferably are supported in the rack-mount BES, and up to twenty-eight T1 ports on these modules can be active. Additional ports typically would be configured in standby mode.

Another network interface module is a E1 Module which might employ a 25 MHz Intel 80960 RISC-based processor. In the disclosed embodiment, the E1 module has up to four E1 interfaces with CCITT G.703/704 framing, and HDB3 line encoding. Each interface is configurable to support data rates up to 2.048 Mbps. The E1 interface supports the CCITT and ANSI Frame Relay protocol, with each port supporting up to 250 DLCIs. The E1 module has the same flexible and economical redundancy scheme as the T1 module, providing for 1:1 or 2:1 redundancy. Up to ten E1 modules are supported in the BES, and up to twenty-eight E1 ports on these modules can be active. Additional ports typically would be configured in standby mode.

Another network interface module is a DS3 Module which might employ an Intel 80960 RISC-based processor. In the disclosed embodiment, the DS3 module supports a single DS3 interface at 44.736 Mbps for interconnecting, for example, multiple Ethernet, Token Ring, and FDDI LANs over a WAN. The DS3 interface supports M13 framing for interfacing to existing DACS equipment in a carrier or private facility and is fully compatible with AT&T Accunet T45 and Bellcore standards. Up to twenty-eight T1s can be supported in channelized mode for point-to-multipoint networking applications. The DS3 interface may support the standards-based CCITT and ANSI Frame Relay protocol, with up to 250 DLCIs per port. The DS3 module includes the same flexible redundancy scheme as the T1 and E1 modules, with 1:1 or 2:1 redundancy. Up to ten DS3 modules are supported by the BES.

As described previously (in the BES Architecture: System Bus/Backplane Design section), each network interface module/card preferably includes a DPIC for providing a standard, card-indpendent interface to the system bus.

Other network interface modules besides the FDDI, the Ethernet, the Token Ring, the T1, the E1, and the DS3 are possible. A person of ordinary skill in the art would know how to design other such modules and incorporate them into the disclosed BES system.

BES Architecture: Data Packet Flow

This section describes how traffic can flow in and out of a BES node according to the invention.

Referring back to FIG. 3, in the disclosed embodiment, the LAN packets first are received by a network interface module such as the Ethernet interface module 78. The network interface module translates the native network packet format into the internal packet format.

Second, the packets (in internal format) are sent via the system bus 43 to the FPSE 62 where a copy of the complete packet is stored in the Central Buffer 56. At the same time, the packet header is sent to the filter 218 in the FPSE. The filter 218 examines the source address of the packet. If the source address has not been seen before, the address and its input port are "learned", and an update is sent to the MAP 64 to update a main address table maintained by the MAP 64. The filter 218 then examines the destination address of the packet and the packet type to determine if it should be forwarded, flooded, or discarded.

Third, if a "bridge" packet, the packet is forwarded by the filter 218 directly to an outbound network interface module (e.g., the Token Ring interface module 82) via the system bus 43. Flooding is required if the destination address has not been seen before, and in this case, the packet is sent to all ports. Discarded packets are simply deleted by the FPSE 62. If a "router" packet, the packet is sent by the filter 218 to the Router Engine 66 via the system bus 43 for processing before being sent back to the FPSE and then to an output network interface module (e.g., the DS3 interface module 86).

Fourth, when received at the network interface module, the internal packets are translated into the appropriate native network packet format (e.g., FDDI, Ethernet, Token Ring, or Frame Relay) and then transmitted to the network connected to the BES via the network interface module.

BES Architecture: System Configurations

The BES may be configured in a number of ways. The BES also may be set-up for either North American or European use.

With reference generally to FIG. 14, a BES bridge system configuration might include a power supply (e.g., 120 Volts or 230 Volts), a dual disk drive module, a Maintenance & Administration Processor (MAP), and a Fast Path Switching Engine (FPSE).

ABES bridge/router system configuration might include a power supply (e.g., 120 V or 230 V), a dual disk drive module, a MAP, a FPSE, and a Router Engine.

A high-availability BES bridge/router system configuration might include the same components as the bridge/router BES system configuration plus another power supply and another MAP.

A redundant BES bridge system configuration might include the same components as the BES bridge system configuration plus another power supply, another MAP, and another FPSE.

A redundant BES bridge/router system configuration might include the same components as the BES bridge/router system configuration plus another power supply, another MAP, another FPSE, and another Router Engine.

Referring to FIG. 17, the table shown summarizes the number of network interfaces supported per network interface module and the maximum network interfaces per BES system, for the disclosed embodiment. A different number of network interfaces per module and a different number of maximum network interfaces per system are possible, as will be appreciated by those of ordinary skill in the art.

BES Software

In general, the BES is programmable and controlled by software typically provided to a user of the BES on a 2.88 Mbyte floppy disk.

Having generally described various aspects of a BES node according to the invention, further disclosure of various aspects of an embodiment of a BES according to the invention is provided below.

BES Internal Packet Format

The BES preferably uses a common (i.e., generic) data representation for all network and internally-generated traffic. The common representation is referred to as an "internal packet" (or "canonical") format. In the disclosed embodiment, the internal packet format contains fixed-position fields which are identified in a table in FIG. 18.

Referring to the table in FIG. 18, when a packet from a particular network enters the BES via a network interface module, the incoming packet preferably is encapsulated with canonical headers and trailers thereby translating it into an internal packet format. Up to 32K bytes may be carried in the disclosed canonical frame format. The frame is carried through the BES intact with space left in front for, e.g, the frame relay DLCI, the Token Ring AC (802.5), Frame Control, and source and destination address. The remainder of the incoming protocol data unit (PDU, the portion of a packet which contains data) information follows the header. Frame data is padded-out to a 32 bit word boundary (which equals the system bus width). The original media frame checksum is removed.

Each frame is appended with a trailer consisting of five fields. The first two-byte length field represents the network PDU length using 802.3/Ethernet length (header not included) and is used to control transfers and for per port byte counting. The next field is Inport which is used to record the source port for filtering and forwarding decisions in the FPSE. The highest three bits also carry FDDI frame trailer status; E (error), VFCS (valid frame checksum), and VDL (valid data length). The third field of the trailer is PreRoute which is used for preempting FPSE filtering by forced routing of the frame to a specific port. The most significant two bits carry the A (address recognized) and C (copied) bits from FDDI. The next field is PLSAP, a field used for two purposes; it either carries the Logical Link Control (LLC) layer "LSAP" or it carries an 16 to 8 bit mapping function of an Ethernet protocol field. The frame is terminated with a cyclic redundancy code (CRC) for frame integrity checking.

Inter-card communication employs the canonical trailer, but the destination address and the source address fields of the header are a "NULL Coral MAC" address to denote internal traffic. Incoming Port carries the source port. Pre-Route is the destination port and PLSAP is undefined.

The TAG field is a 4 bit field which is transmitted on the bus with every data transfer. The TAG bits are used to ensure proper synchronization and error detection of backplane data. During backplane control information transfers, each of the TAG bits are used as a parity bit for one byte of the 4 byte wide control data transfer. During pocket data transfers, the TAG bits are used to indicate which field of the canonical packet is being transmitted. The start of frame tag value is ox0; this is transmitted during the first word of a canonical packet when the FC, AC, and FR fields are transmitted. A TAG of ox1 indicates the first 4 bytes of the destination address are being transferred. A TAG of ox2 indicates that the last 2 bytes of destination address and the first 2 bytes of source address are being transmitted. A value of ox3 indicates the last 4 bytes of source address, and a value of ox6 indicates 4 bytes of information. Tables 1–4 below indicate the meaning of other values.

TABLE 1

| | Zero bytes of Pad | | | |
|---|---|---|---|---|
| 80960 Byte 3 | 80960 Byte 2 | 80960 Byte 1 | 80960 Byte 0 | TAG (Het) |
| FC | AC | FR (MSB) | FR (LSB) | 0 |
| DA3 | DA2 | DA1 | DA0 (MSB) | 1 |
| SA1 | SA0 (LSB) | DA5 (MSB) | DA4 | 2 |
| SA5 (LSB) | SA4 | SA3 | SA2 | 3 |
| Input_Port | Length (MSB) | Length (LSB) | Info | 9 |
| CRC (MSB) | CRC (LSB) | PLSAP | Pre_Route | B |

TABLE 2

One byte of Pad

| 80960 Byte 3 | 80960 Byte 2 | 80960 Byte 1 | 80960 Byte 0 | |
|---|---|---|---|---|
| FC | AC | FR (MSB) | FR (LSB) | 0 |
| DA3 | DA2 | DA1 | DA0 (MSB) | 1 |
| SA1 | SA0 (MSB) | DA5 (LSB) | DA4 | 2 |
| SA5 (LSB) | SA4 | SA3 | SA2 | 3 |
| Input_Port | Length (MSB) | Length (LSB) | Pad | A |
| CRC (MSB) | CRC (LSB) | PLSAP | Pre_Route | B |

TABLE 3

Two bytes of Pad

| 80960 Byte 3 | 80960 Byte 2 | 80960 Byte 1 | 80960 Byte 0 | TAG (Het) |
|---|---|---|---|---|
| FC | AC | FR (MSB) | FR (LSB) | 0 |
| DA3 | DA2 | DA1 | DA0 (MSB) | 1 |
| SA1 | SA0 (MSB) | DA5 (LSB) | DA4 | 2 |
| SA5 (LSB) | SA4 | SA3 | SA2 | 3 |
| Pad | Info | Info | Info | 7 |
| Input_Port | Length (MSB) | Length (LSB) | Pad | A |
| CRC (MSB) | CRC (LSB) | PLSAP | Pre_Route | B |

TABLE 4

Three bytes of Pad

| 80960 Byte 3 | 80960 Byte 2 | 80960 Byte 1 | 80960 Byte 0 | |
|---|---|---|---|---|
| FC | AC | FR (MSB) | FR (LSB) | 0 |
| DA3 | DA2 | DA1 | DA0 (MSB) | 1 |
| SA1 | SA0 (MSB) | DA5 (LSB) | DA4 | 2 |
| SA5 (LSB) | SA4 | SA3 | SA2 | 3 |
| Pad | Pad | Info | Info | 8 |
| Input_Port | Length (MSB) | Length (LSB) | Pad | A |
| CRC (MSB) | CRC (LSB) | PLSAP | Pre_Route | B |
| Info | Info | Info | Info | 0 x 6 |
| | | Normal Info TAG | | |

System Bus/Backplane: Further Disclosure

The system bus preferably is time division multiplexed (TDM). The following description of the system bus details one particular embodiment. Other embodiments of the system bus are possible. A person of ordinary skill in the art will know of such other embodiments.

In one embodiment, the TDM bus generally is responsible for (i) card control and (ii) data movement.

Card control monitors each card for proper operation—resetting, initializing, or disabling each when appropriate. Data movement can move either LAN/WAN packets, or Telco synchronous circuit traffic. When packets are being moved, the source can be either from a network interface card or from a packet processing card. Similarly, the destination can be to either of these types of cards.

Bus operation requires two major sub-systems—a address/mode/clk generator and a data movement/control logic. The active MAP in each system is responsible for the address/mode/clk generation. Each card is responsible for its own data movement/control logic.

The address/mode/clk generator on the MAP runs at a synchronous rate of 25 MHz. The bus runs at that rate by using pipe-lining to reduce the timing requirements during each clock cycle of the bus. Once the bus has been pipelined, Bus Transceiver Logic (BTL) components may be used to cost effectively provide the electrical characteristics to reliably transfer the data and address interface to each network interface card.

The clock generator on the active MAP generates a master clock with a nearly perfect 50/50 duty cycle. It then is converted to ECL 100K voltage levels, and is provided to up to 20 slots in a system. Each branch of the clock tree is divided into three segments, servicing three bus slots. To reduce the clock skew to within acceptable levels, each backplane route maintains the same wire distance to within an inch. Upon receipt by a network interface card, the ECL clock is level shifted to CMOS levels by a high performance (>>Gigahertz) discrete transistor. The CMOS clock is then used as a reference into a Gallium Arsenide phased locked loop (PLL). The PLL guarantees that the signals at the end of the clock tree are aligned in phase to within 2 nanoseconds of the input clock reference. Each output off the buffer should be within two nanoseconds (ns) for all points on the respective net, and no more than four ns from slot to slot.

The address/mode generation circuit is also part of the MAP. The circuit generates outputs to the bus, assigning opportunities for data transfer to each time slot. The circuit has 4096 time slots, allowing data to be transferred every 40 ns. Thus, the bus cycles through all times slots every 40×4096 ns=164 microseconds (us).

To achieve higher transfer rates between cards, more than one time slot can be assigned for each set of cards, with each additional slot equally distributed in time. That is, if a unidirectional (half-duplex) data transfer between two cards occurs every 17 microseconds, 10 (i.e., INT(164/17)+1) of the 4096 entries should be assigned to the two cards. In addition, the entries should be evenly spaced among the 4096 entries occurring every 409 (i.e., INT(4096/10)) entries.

If bi-directional data movement is required, a second set of ten entries are required with a different set of address fields— swapping the source and destination fields that are explained later.

Address and the mode generation are closely related, since the mode defines what action should occur with the addresses. At this time, four mode bits uniquely define 16 different types of bus transactions.

During bus cycles with the mode bits all set, no operation is performed. The NOP bus made invalidates any address information present on the bus. This mode is used during system initialization, since the circuit implementation will drive the TDM bus with NOPs until its static RAMs are loaded.

Two eight-bit address fields SRC(7:0) and DST(7.0) select the bus's data source port and destination port during packet and circuit data transfer operations. Special transfers require using the geographical slot number to directly access the DPIC on each card. This is used to initialize and maintain port cards and the DLP during system operations.

The twenty bits of mode and address information are programmed by the MAP.

When the MAP is first powered on, unknown values are stored in its static RAMs that contain the TDM programming. To prevent improper accesses on the bus, the power on reset signal forces the TDM bus to output all 1's on the mode bits. This signals the bus to perform no operations. It is used to idle the bus, until proper values can be loaded into the static RAMS as described above. The software in the reset sequence should load all entries of the static RAM and NOPs, and then globally enable the TDM. This will cause a glitchless switchover from the forced NOPs to the programmed NOPs. Once the switchover has occurred, the TDM can be programmed without concern of invalid accesses occurring due to indeterminate values in the TDM table.

The values that are output during each TDM bus cycle are programmed by the MAP, with the intent of rarely changing the TDM programming. Each entry can take 340 microseconds to program, worse case. Statistically, the value will take 170 micro-seconds. If the entire TDM is reprogrammed a single entry at a time, it may take a second or more.

A current constraint of the system design is that the DLP engine will only support 32 'packet switch' channels. These channels are together, and begin on a 32 channel boundary. Two DLPs can be installed in a system, however, only one can be active. The two DLPs will be addressed with SRC/DST addresses from OxAO to OxBF for the 2nd DLP, and OxC0 to OxDF for the 1st DLP.

The second major sub-system is the data transfer and control logic. Unlike the address/mode/clk generation logic that is present only on the MAP, the data transfer logic is on every card.

The data transfer and control logic is responsible for 32 packet/circuit data bits and 4 bidirectional tag bits during each bus cycle. Two signals are used as handshake lines for each data transfer: VALID and TAKEN.

To understand the operation of the hand-shake lines, it is important to understand the timing relationships among the clock, the address/mode bits, and the data bus. Since the system is pipe-lined, and the address generation is linear (non-branching), a simple relationship between bus address/mode and data is maintained.

The MAP's TDM circuit drives an address and a corresponding bus mode onto the bus shortly after the rising edge of the master clock. These addresses are latched by all cards on the bus at the next rising edge. A fixed number of clock cycles are given to properly decode what operation should occur, and whether the card in question has been selected to receive or originate data for the bus. The selected source of data drives the data bus, the tag bus, and the VALID signal a fixed pipeline delay after the addresses have been removed from the bus. The selected destination latches the data bus, the tag bus, and the VALID signal—while driving the TAKEN signal.

Since the VALID signal is not latched until after the TAKEN signal has already been driven—post-processing of the state of the two handshaking bits is required. This processing determines whether the outgoing source queue and the incoming destination queue are changed. Four combinations of two bits can occur:

If VALID and TAKEN are active in the same clock period, the destination port will transfer the data sampled from a temporary register into the appropriate incoming queue in the DPIC or DLP buffer. The outgoing queue is also advanced.

If VALID is active, but TAKEN is not—the source of the data will re-transmit the same data during the next addressed time slot. This will continue indefinitely until TAKEN is sampled. Neither the incoming or outgoing queue will be affected.

If VALID is active, but TAKEN is asserted—no data is transferred to the source. This is accomplished by overwriting the temporary data register—without transferring its contents to the incoming queue. Both the incoming and outgoing queue remains unchanged.

If VALID and TAKEN are inactive, the source had no data to transmit—and the destination did not want any data. Again, neither queue is affected.

From the above descriptions of TAKEN and VALID, one can deduce that the VALID signal is asserted whenever the source outgoing queue is not empty. The TAKEN signal is asserted when the incoming queue is not full. These two signals are similar in function to a FIFO's empty flag (VALID), and full flag (TAKEN).

The width of the data buss and tag bus has been ignored until this point, since the above method can be extended to whatever size bus is necessary to achieve a desired data transfer rate. A 32-bit bus with 4 tag bits is used. This results in a data transfer rate of 800 megabits/second on the 32 data bits. The DPIC functions to construct these 32-bit words for transmission across the bus. The tag bits are used to indicate incomplete 32-bit words, packet start and end of frame, etc. These bits are also buffered by the DLP buffer, to aid in its parsing of the buffered packets.

FPSE: Further Disclosure

One particular embodiment of the FPSE (or DLP) will now be described in detail. Other embodiments of the DLP are possible, and a person of ordinary skill in the art will now of such other embodiments.

In one embodiment, the DLP keeps only one copy of each packet it receives. Once received, the packet data is never moved or copied internally. All internal operations are done with the pointers and packet heads. The DLP can hold up to 16,383 packets and be processing as many as 192 of them at any one time. The DLP can receive packets from 32 source ports (port=network interface card) simultaneously in any combination of phase and speed as long as its total incoming bit rate does not exceed 383 Mbps. The DLP can transmit packets to 31 destinations ports simultaneously in any combination of phase and speed as long as its total outgoing bit rate does not exceed 383 Mbps. A maximum of 2,047 packets can be queued for each outgoing port. if a queue exceeds that number the overflow packets are dropped out the null queue. There is never a gap in the middle of a packet. Once a packet begins coming out of the DLP, the data is always ready. The DLP can always accept packet data without losing it, regardless of speed. The DLP has the ability to forward, drop, and preroute and flood to 31 ports. The filter address ram, filter data ram, and new address ram are double buffered. Access to all internal data bases does not alter system performance. Packets are time stamped after processing by the filter. If the preset aging value is exceeded, the aged packets are dropped out the null queue. The DLP counts total bytes and packets for each known source address. This along with other gathered information is used to provide network statistics to the network manager. The DLP can continuously filter 390,000 packets/sec and handle burst requests of 2,080,000 packets/sec. These rates are based on the DLP's normal operating frequency of 25 MHz.

In one particular embodiment, the central function of the Filter board 218 (FIG. 3) of the FPSE (or DLP) is to examine the 48-bit source and destination addresses of an incoming packet and determine the correct exit port for that packet, based on prior learned knowledge of the network. While doing this, the filter also maintains byte and packet count statistics on traffic seen on all of the BES attached networks, and implements packet filtering (blocking) as directed by a network manager.

The BES transfers a copy of every packet seen on every attached network to the Data Link Processor. The Filter examines the SOURCE address of every packet seen, and the port it was seen on, and determines if it has seen this source before. If this is the first time the source address has been seen, The address and the input port are "learned." That is, the filter now has knowledge of the location of another node in the network, or at least the port through which the node can be reached. The filter also examines the DESTINATION address of the incoming packet to determine if it has previously "learned" the address as a source address. If so, the packet can be directed out the port on which the address was learned ("forwarded") and on toward the intended destination. If the destination address has not been previously learned, the Filter has no knowledge of the location of the destination node and the packet must be directed out all interfaces except the original port on which it entered the BES. This operation is called "flooding." Since the packet was only copied from the original network, a duplicate packet would be created if it were sent out that port. After a packet is returned from the destination node, its address will be learned as a source address and flooding will no longer be required.

Central to the operation of the Filter is a "learned address table." This table contains up to 8191 48-bit addresses that the filter has learned from packets seen on the attached networks. Associated with this table is a "filter data table." For each of the learned 48-bit addresses, there are four 16-bit words containing information about the learned address. Included in this information is the port (port=network interface card) on which the address was seen and the number of packets (and bytes within the packets) seen with this address as the source.

The most critical parameter in the performance of the filter is the speed at which it can search the learned address table. Two searches of the table must be make on every packet seen, one for the DESTINATION address to determine if the address is known by the filter, and once on the SOURCE to determine if there is a new source address to be learned. The filter is designed to make both of the searches 2.56 microsec., resulting in a packet processing rate of 390,625 packets per second.

The interfaces to the filter can be divided into three basic groups; packet header (input), attach interface (output), and the control interface. The first two interfaces are involved in actual high-speed packet processing, while the later is for lower speed set-up and control functions as directed by the Maintenance and Administration Processor. (Note that the entire Data Link Processor is a synchronous system. Operations on the Filter are fully synchronous with operations on both the Queue 55 and the Buffer 56. The three boards operate on the 40 nsec system clock and are synchronized every 64 cycles by a signal sourced by the Buffer.)

The packet header input interface is unidirectional from the Queue Board and is in common with the Queue to Buffer Interface. As packets are transferred from the Queue to the Buffer, a copy of the header information is made by the filter for processing. Note that, while the entire packet is transferred into the Buffer, the Filter copies only the first 16 bytes (the header) and last 8 bytes (the trailer). At the same time it is copying the header, the Filter takes a copy of the starting address of the packet location in the Buffer memory.

The result of the Filter process is passed back to the Queue over the Attach Interface. This result consists of the PACKET POINTER, pointing to the first word of the packet, and the port to which the packet is to be transferred. In the case of a "Flood", there may be as many as 30 different output ports. In this case, there is a separate POINTER/Output$_{13}$ port pair for each copy of the packet to be sent.

The control interface logic for the filter is partitioned between the filter board and the buffer board.

MAP: Further Disclosure

A table which controls the deallocation/allocation of the system bus bandwidth preferably has 4096 slots, is located on the MAP, and is controlled by MAP software. To avoid the need for large amounts of configuration information, the MAP preferably supports dynamic allocation/deallocation of system bus bandwidth. The bandwidth, in the disclosed embodiment, is allocated at the time of card "check-in" (e.g., when a card is "hot" inserted). Note that because a BES according to the invention supports "hot swapping", card check-in does not occur only at system startup. Bandwidth preferably is deallocated when/if one or more cards fail. Deallocated bandwidth may be reassigned to a similar or different card type that "checks-in" later.

In the disclosed embodiment, the MAP may have only one incoming control channel, but many outgoing control channels. There is one outgoing control channel associated with each programmable port card. Similar to the control channels, there will be one incoming data channel and many outgoing data channels (one associated with each ppc). Data being held for or from the data channels will be in a FIFO of "common" memory buffers. The data contained in these buffers will be DMA'ed in from or out to the data channels.

A floppy controller may be associated with the MAP to allow reading and writing of up to two disk drives.

Other modifications and implementations will occur to those skilled in the art without departing from the spirit and the scope of the invention as claimed. Accordingly, the invention is to be defined not by the preceding illustrative description, but by the following claims.

What is claimed is:

1. An internetworking system for exchanging packets of information between networks, said system comprising:

a network interface module for connecting a network to said system, receiving packets from the network in a native packet format used by the network and converting each received native packet having a generic format common to all networks connected to said system, and converting each said generic packet to the native packet format for transmission to the network, a communication channel for carrying said generic packets to and from said network interface module, said channel having bandwidth, a first processing module for controlling dynamic allocation and deallocation of said channel bandwidth to the network connected to said system via said network interface module, a second processing module for receiving all said generic packets put on said channel by said network interface module, determining whether each said generic packet needs to be bridged or routed to a destination network interface module, and bridging each said generic packets determined to need bridging;

a third processing module for receiving and routing each said generic packet determined to need routing from said second processing module via said channel, said third processing module routing those generic packets received from said second processing module by altering those generic packets to contain appropriate destination information and transmitting those altered packets to said second processing module; and said second processing module also for receiving said altered generic packets, determining the destination network interface for each of said altered generic packets, and transmitting those altered generic packets to the destination network interface module.

2. The system of claim 1 wherein said network interface module converts each of the received native packets to packets having said generic format by appending information to each of the received native packets.

3. The system of claim 1 wherein time division multiplexing is utilized in said dynamic allocation and deallocation of said communication channel bandwidth by said first processing module.

4. The system of claim 1 wherein said second processing module comprises dedicated electronic components for performing all functions required of said second processing module including receiving all said generic packets put on said channel by said network interface module and determining a destination network interface module for each said generic packet on said channel and whether each said generic packet needs to be bridged to the destination network interface module.

5. The system of claim 1 wherein said second processing module comprises dedicated electronic components for performing all functions required of said second processing module including receiving all said generic packets put on said channel by said network interface module and determining a destination network interface module for each said generic packet on said channel and whether each said generic packet needs to be routed to the destination network interface module.

6. The system of claim 1 wherein said network interface module may be inserted into said system while said system is operational substantially without disruption to the operation of said system, said first processing module dynamically allocating said communication channel bandwidth to said network interface module.

7. The system of claim 1 wherein said network interface module and any of said processing modules may be removed from said system while said system is operational substantially without disruption to the operation of said system if a redundant duplicate of the removed module is present in said system, said first processing module dynamically deallocating said communication channel bandwidth previously allocated to the removed module.

8. The system of claim 1 further comprising at least one redundant network interface module which is a duplicate of said network interface module to provide fault tolerance.

9. The system of claim 1 wherein a logical network can be formed which includes one or more users from a plurality of physical networks connected to said system.

10. An internetworking system for performing both routing and bridging functions to exchange packets of information between computer networks, said system comprising:

a network interface module for connecting a computer network to said system, receiving packets from the computer network in a native packet format used by the computer network and converting each of the received native packets to a packet having a generic format common to all computer networks connected to said system, and converting each of said generic packet to the native packet format for transmission to the computer network, a communication channel for carrying said generic packets to and from said network interface module, said channel having bandwidth, a first processing module for controlling dynamic allocation and deallocation of said channel bandwidth to the computer network connected to said system via said network interface module, a second processing module for receiving all said generic packets put on said channel by said network interface module, determining whether each said generic packet needs to be routed or bridged to a destination network interface module, and transmitting those generic packets determined to need bridging to the destination network interface module via said channel, a third processing module for receiving each of said generic packets determined to need routing from said second processing module via said channel, altering those generic packets determined to need routing to contain appropriate destination information, and transmitting those altered generic packets back to said second processing module via said channel, and said second processing module also for receiving said altered generic packets, determining the destination network interface for each of said altered generic packets, and transmitting each of the altered generic packets to the destination network interface module.

11. An internetworking system for performing both routing and bridging functions, comprising:

a network interface card for connecting a network to said system, receiving packets from the network in a native packet format used by the network and converting each received native packet to a packet having a generic format common to all networks connected to said system, and converting each said generic packet to the native packet format for transmission to the network, a bus for carrying said generic packets to and from said network interface card, said bus having bandwidth, a control processor for controlling dynamic allocation and deallocation of said bus bandwidth to the network connected to said system via said network interface card, a central switch processor for receiving all said generic packets put on said bus by said network interface card, determining whether each said generic packet needs to be routed or bridged to the destination network interface card, and a router engine for receiving and routing each said generic packet determined to need routing from said central switch processor via said bus, said router engine routing those generic packets received from said central switch processor by altering those generic packets to contain appropriate destination information and transmitting those altered packets to said central switch processor;

said central switch processor also for receiving said altered generic packets and determining the destination network interface for each of said altered generic packets.

* * * * *